United States Patent
Yoshimura

[11] Patent Number: 5,991,245
[45] Date of Patent: *Nov. 23, 1999

[54] REPRODUCING APPARATUS FOR RECORDED MEDIUM

[75] Inventor: Masaki Yoshimura, Sagamihara, Japan

[73] Assignee: Kabushiki Kaisha Kenwood, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/809,081

[22] PCT Filed: Jul. 25, 1996

[86] PCT No.: PCT/JP96/02083

§ 371 Date: Mar. 14, 1997

§ 102(e) Date: Mar. 14, 1997

[87] PCT Pub. No.: WO97/05613

PCT Pub. Date: Feb. 13, 1997

[30] Foreign Application Priority Data

Jul. 27, 1995 [JP] Japan .................................. 7-210961

[51] Int. Cl.$^6$ .................................................. G11B 17/22
[52] U.S. Cl. ............................................. 369/34; 369/178
[58] Field of Search .................................. 369/34, 36, 38, 369/75.1, 75.2, 77.1, 77.2, 191–194, 178; 360/92

[56] References Cited

U.S. PATENT DOCUMENTS

| | | |
|---|---|---|
| 4,685,095 | 8/1987 | Rudy et al. . |
| 4,893,293 | 1/1990 | Endo et al. ................................ 369/34 |
| 5,021,902 | 6/1991 | Ishikawa et al. .......................... 360/92 |
| 5,177,722 | 1/1993 | Nakamichi et al. . |
| 5,191,569 | 3/1993 | Kurosawa et al. .......................... 369/38 |
| 5,216,645 | 6/1993 | Sakayama . |
| 5,590,047 | 12/1996 | Uehara .............................. 364/478.02 |
| 5,802,021 | 9/1998 | Mukaida .................................... 369/34 |

FOREIGN PATENT DOCUMENTS

| | | |
|---|---|---|
| 0 541 208 A1 | 5/1993 | European Pat. Off. . |
| 0 563 927 A2 | 10/1993 | European Pat. Off. . |
| 0 612 070 A2 | 8/1994 | European Pat. Off. . |
| 0 614 178 A2 | 9/1994 | European Pat. Off. . |
| 0 702 363 A1 | 3/1996 | European Pat. Off. . |
| 0 709 841 A1 | 5/1996 | European Pat. Off. . |
| 0 724 261 A2 | 7/1996 | European Pat. Off. . |
| 44 04 006 A1 | 8/1994 | Germany . |
| 44 27 494 A1 | 2/1995 | Germany . |
| 3-147563 | 6/1991 | Japan . |
| 7-121967 | 5/1995 | Japan . |
| 2 241 819 | 9/1991 | United Kingdom . |

Primary Examiner—William J. Klimowicz
Attorney, Agent, or Firm—Sixbey, Friedman, Leedom & Ferguson, PC; Eric J. Robinson

[57] ABSTRACT

A recording medium reproducing apparatus capable of accommodating a plurality of recorded media and exchanging a recorded medium even during the reproduction of another recorded medium, the apparatus being made easy to use. A stocker accommodates a plurality of recorded medium holders for holding a recording medium. A first transport unit transports the recorded medium holder between the inside of the stocker and the outside of an apparatus housing. A second transport unit transports the recorded medium holder between the inside of the stocker and a reproduction unit. The stocker is moved up and down in order to align the position of the recorded medium holder with the position of the first or second transport unit. When the recorded medium holder is transports from the outside of the housing to the inside of the stocker, a presence/absence of a recorded medium is detected by a light emitting unit and a light receiving unit. A controller stores information of a presence/absence of a recorded medium at each stage of the stocker. If the second transport unit instructs to transport the recorded medium holder not holding a recorded medium to the reproducing unit, the controller neglects this instruction.

6 Claims, 22 Drawing Sheets

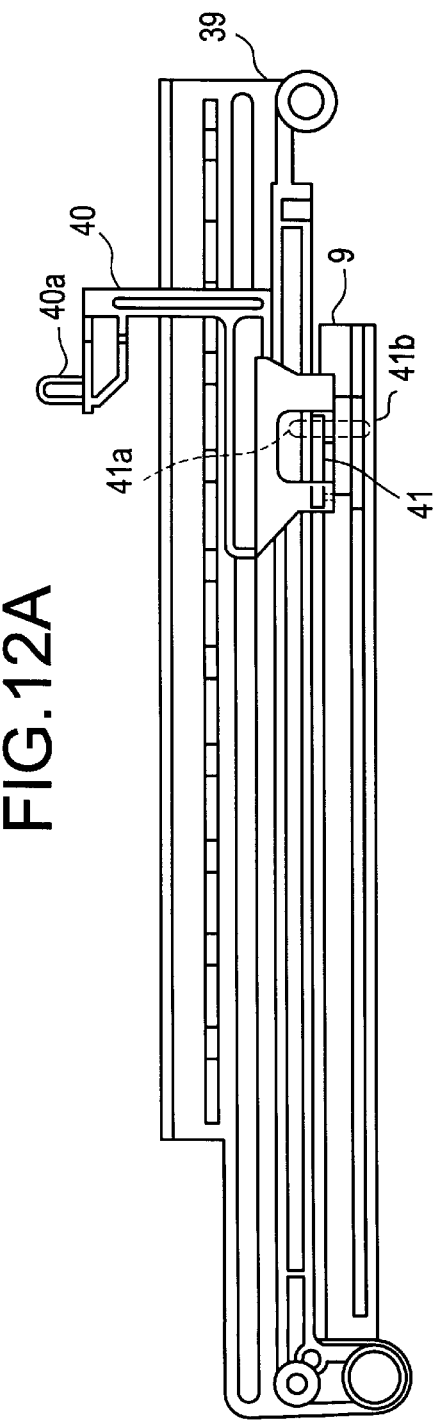
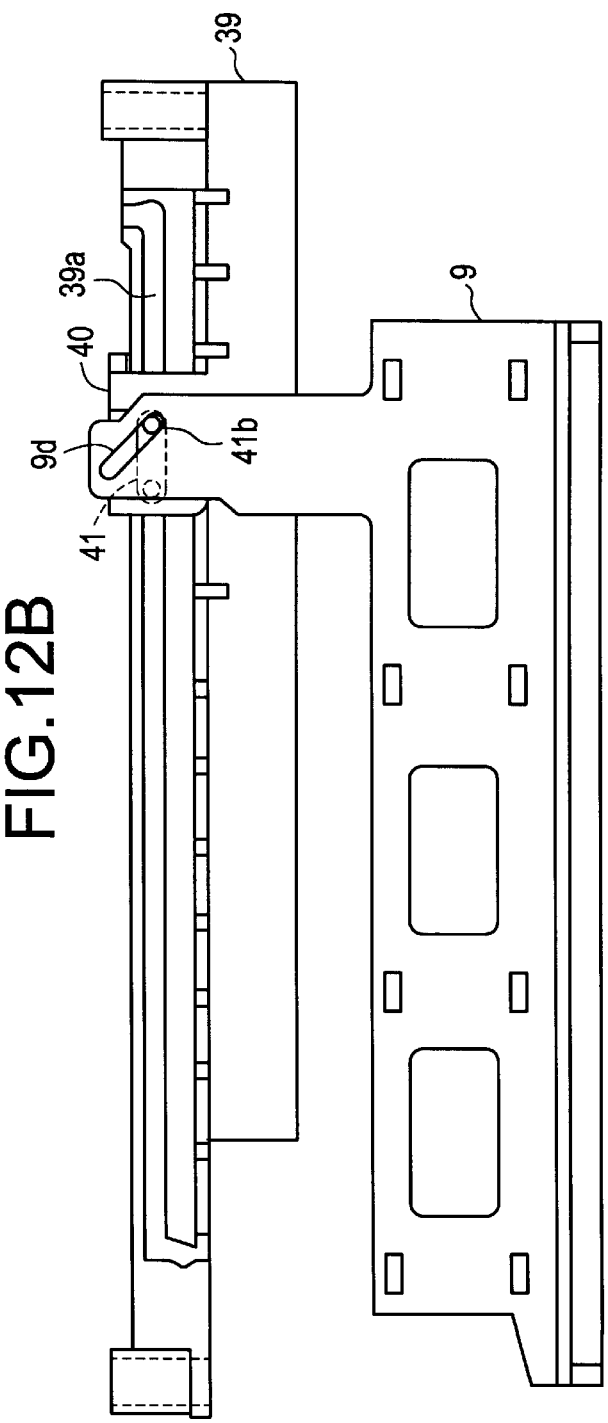
FIG.12A
FIG.12B

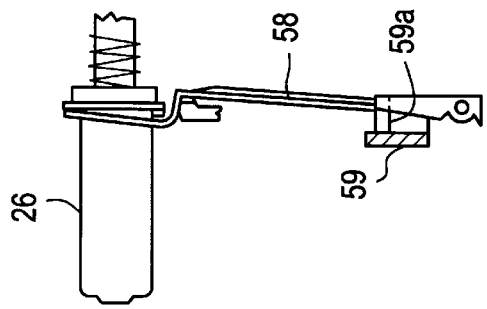
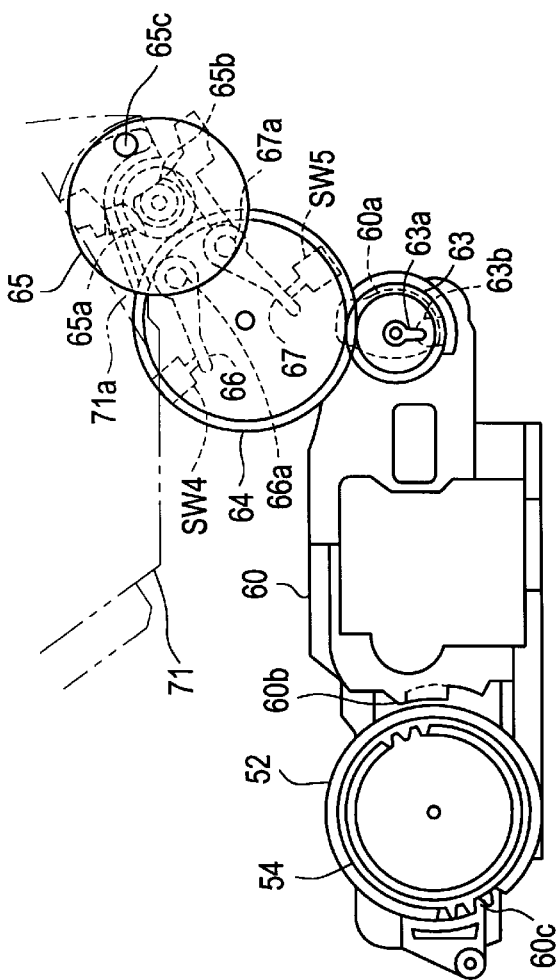
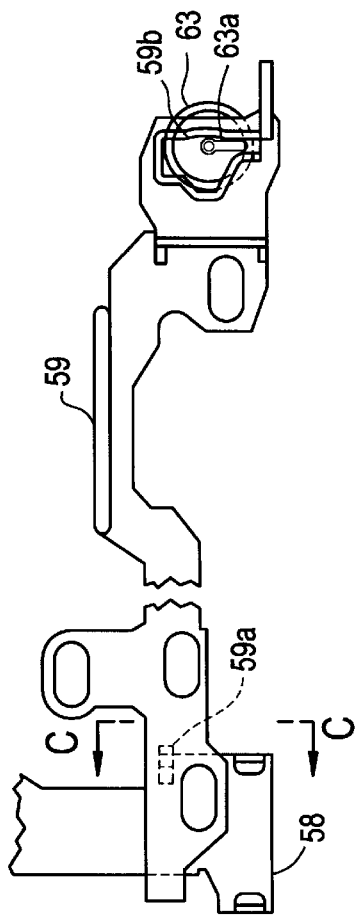

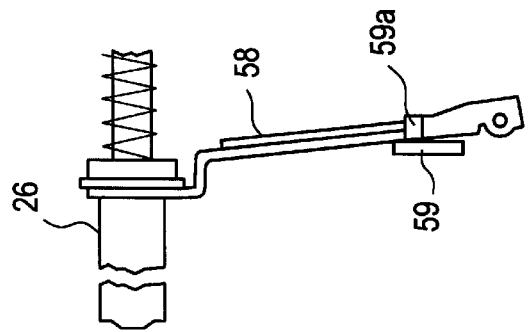
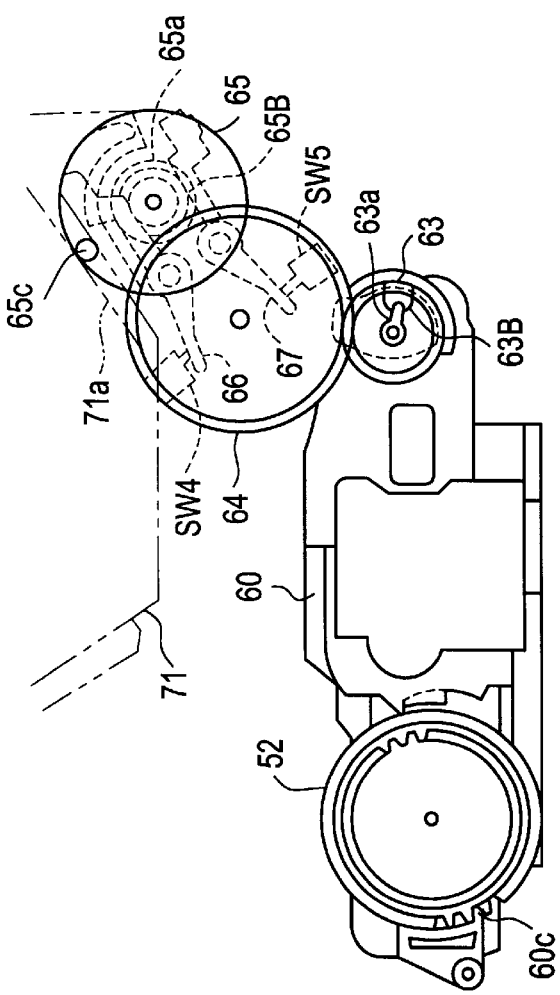
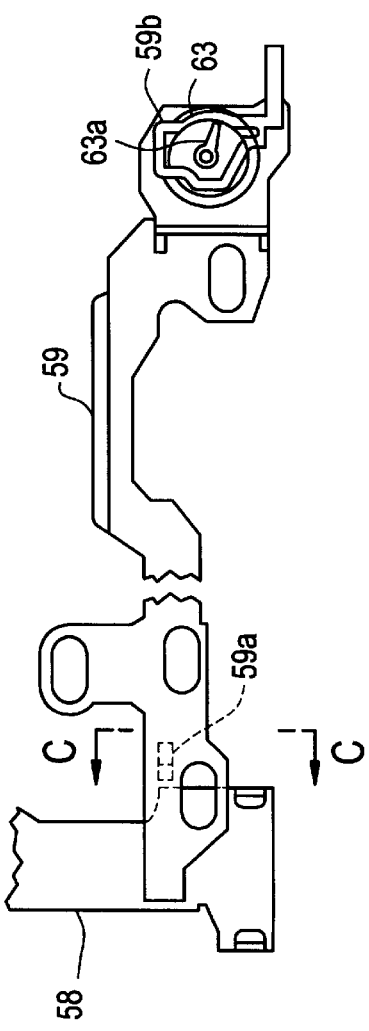

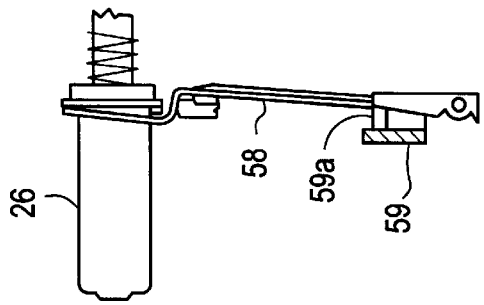
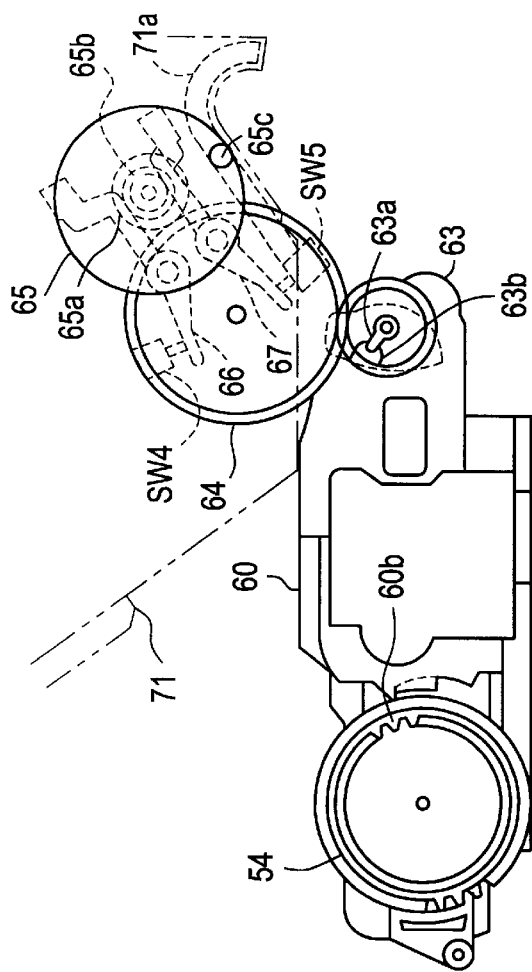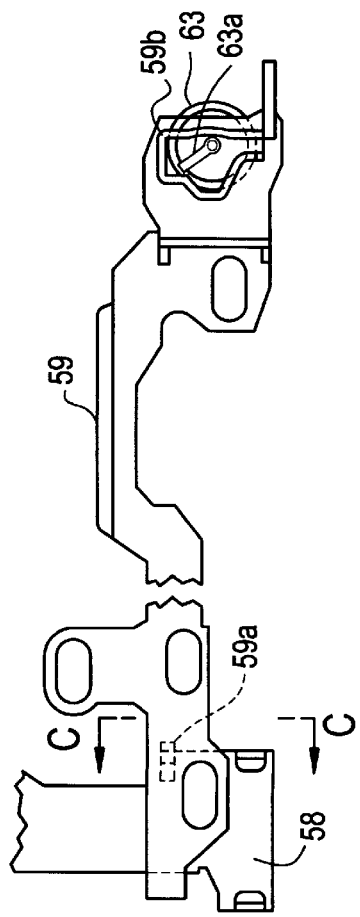

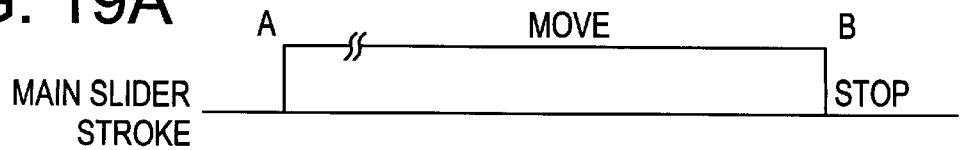
FIG. 19A MAIN SLIDER STROKE
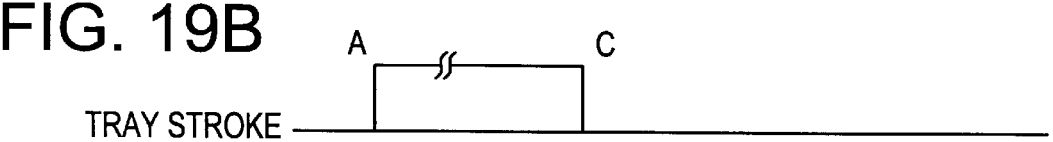
FIG. 19B TRAY STROKE
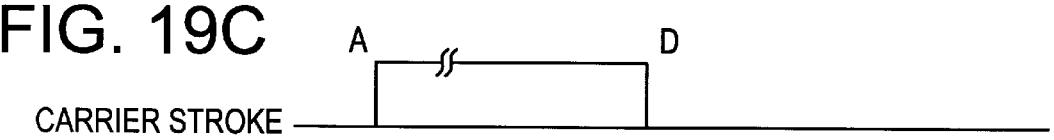
FIG. 19C CARRIER STROKE
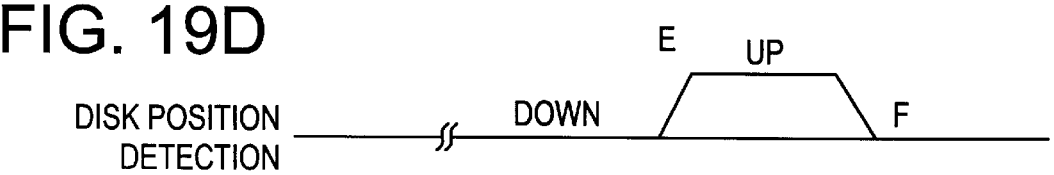
FIG. 19D DISK POSITION DETECTION
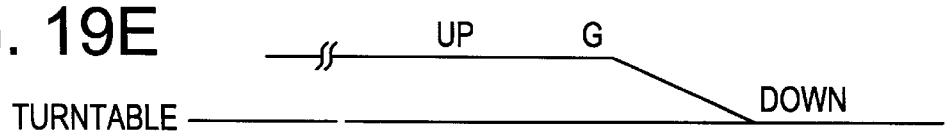
FIG. 19E TURNTABLE
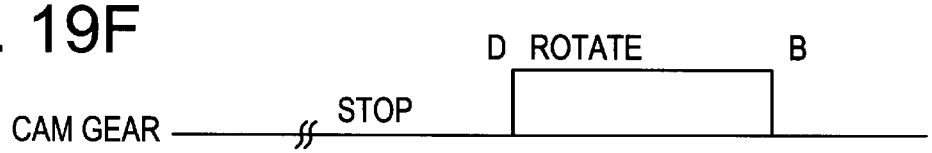
FIG. 19F CAM GEAR
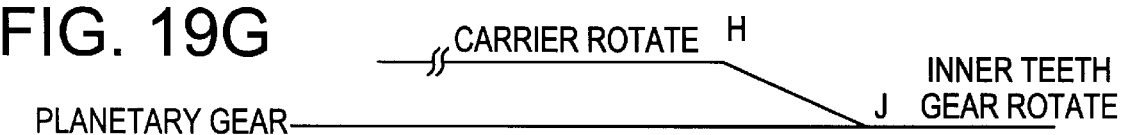
FIG. 19G PLANETARY GEAR
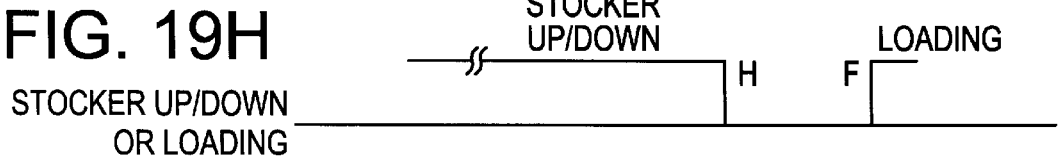
FIG. 19H STOCKER UP/DOWN OR LOADING

REPRODUCING APPARATUS FOR RECORDED MEDIUM

TECHNICAL FIELD OF THE INVENTION

The present invention relates to a recorded medium reproducing apparatus having a recorded medium exchanger, and more particularly to controlling to transport a recorded medium in a recorded medium stocker to reproducing means and to the outside of an apparatus housing.

RELATED BACKGROUND ART

As a conventional recorded medium reproducing apparatus having a recorded medium exchanger, a disk reproducing apparatus such as shown in FIG. 22 disclosed in Japanese Patent Laid-open Publication No. 4-38673 is known in which a stocker houses a plurality of carriers each capable of placing a disk thereon and is raised or lowered by stocker transport means to a height at which a desired carrier is pulled out by a tray. Namely, the stocker is moved by a distance corresponding to the number of shelves for housing carriers.

The tray is transported between a load position shown in FIGS. 22(a) and 22(b) and an eject position shown in FIGS. 22(c). As shown in FIG. 22(a), the carrier having a desired disk placed thereon is pulled out on the tray at the load position, and the disk is clamped by clamping means to reproduce the disk as shown in FIG. 22(b).

As the tray with the carrier moves from the position shown in FIG. 22(a) to the position shown in FIG. 22(c), the carrier on the tray is exposed to the outside of the apparatus housing. In this state, the disk on the carrier is exchanged or a new disk is placed on the carrier. As the tray with the carrier moves from the position shown in FIG. 22(c) to the position shown in FIG. 22(a) and the carrier on the tray is moved back to the stocker, the disk can be exchanged or a new disk can be added to the apparatus. This disk reproducing apparatus is advantageous over a conventional disk reproducing apparatus with an exchanger in that a disk magazine is not used. The disk magazine is expensive, and if it is dismounted from the apparatus and placed at a different position, it takes some time to locate this disk magazine. This is inconvenient to use.

However, this disk reproducing apparatus disclosed in the above-described Japanese Patent Laid-open Publication No. 4-38673 has only one means for pulling a carrier out of the stocker. Therefore, a disk in the stocker cannot be exchanged during the reproduction when the carrier is at the position of reproducing means.

The invention has been made under the above circumstances. It is an object of the present invention to provide a recorded medium reproducing apparatus capable of accommodating a plurality of recorded media and exchanging a recorded medium in a stocker even during the reproduction of another recorded medium, the apparatus being made easy to use and preventing unnecessary operations.

A recorded medium reproducing apparatus of this invention comprises: a recorded medium holder for holding a recorded medium; a stocker capable of accommodating the recorded medium holder; reproducing means for reproducing a recorded medium; first transport means for transporting the recorded medium holder between the inside of the stocker and the outside of an apparatus housing; second transport means for transporting the recorded medium holder between the inside of the stocker and a reproduction position; positioning means for determining a relative position between the recorded medium holder in the stocker and the first or second transport means; recorded medium detecting means for detecting whether a recorded medium is accommodated in the stocker; first instructing means for instructing to operate the first transport means; second instructing means for instructing to operate the second transport means; and control means for controlling to operate the first transport means if the first instructing means instructs to transport the recorded medium holder not holding a recording medium and not to operate the second transport means if the second instructing means instructs to transport the recorded medium holder not holding a recording medium.

According to the recorded medium reproducing apparatus of this invention, even while the second transport means transports the recorded medium from the stocker to the recorded medium reproducing means and the recorded medium is reproduced, the positioning means aligns the position of a desired recorded medium holder with the position of the first transport means and the recorded medium holder is transported between the inside of the stocker and the outside of the housing. It is therefore possible to exchange recorded media or add a new recorded medium.

Even if the second instructing means instructs to transport the recorded medium holder in the stocker not holding a recorded medium, the second transport means is not operated. Therefore, the recorded medium reproducing apparatus becomes easy to use and prevents unnecessary operations.

BRIEF DESCRIPTION OF THE DRAWINGS

FIG. 12(a) is a plan view showing part of the recorded medium reproducing apparatus according to the embodiment of the invention, and FIG. 12(b) is a side view showing the part shown in FIG. 12(a).

FIG. 16(a) is a plan view showing part of the recorded medium reproducing apparatus according to the embodiment of the invention, FIG. 16(b) a plan view showing another part of the recorded medium reproducing apparatus in the state shown in FIG. 16(a), and FIG. 16(c) is a cross sectional view taken along line C—C of FIG. 16(b).

FIGS. 17(a) to 17(c) are diagrams showing another state of the part shown in FIG. 16.

FIGS. 18(a) to 18(c) are diagrams showing another state of the part shown in FIG. 16.

FIGS. 19(a) to 19(h) are charts illustrating the operation of the recorded medium reproducing apparatus according to the embodiment of the invention.

DESCRIPTION OF THE EMBODIMENTS

Recorded medium reproducing apparatus according to the embodiments of the invention will be described with reference to the accompanying drawings. First, with reference to FIGS. 20(a) to 20(c), the outline of the recorded medium reproducing apparatus of the embodiments will be described. Obviously, as a recorded medium, various types of media can be used. In the following embodiments, a compact disk (merely called a disk) is used as a recorded medium. A carrier for carrying a disk is housed in a shelf at each stage (in the embodiment, six stages) of a stocker 21 disposed in a housing. First transport means transports a disk between the inside of the stocker 21 and the outside of the housing, and second transport means transports a disk between the inside of the housing and reproducing means. As the first transport means transports a carrier to the inside of the housing, a presence/absence of a disk is detected by a light emitting unit and a light receiving unit, and a presence/absence of a disk at the corresponding stage of the stocker 21. The first and second transport means are not driven in an up/down direction.

Figure 20A:
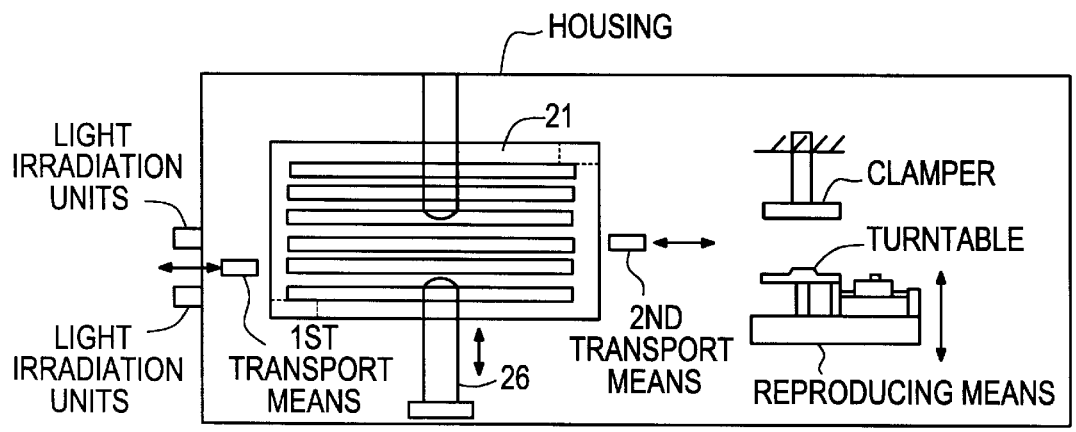
FIG. 20(a) is a schematic diagram showing the structure of the recorded medium reproducing apparatus according to the embodiment of the invention.
Figures 20B, 20C:
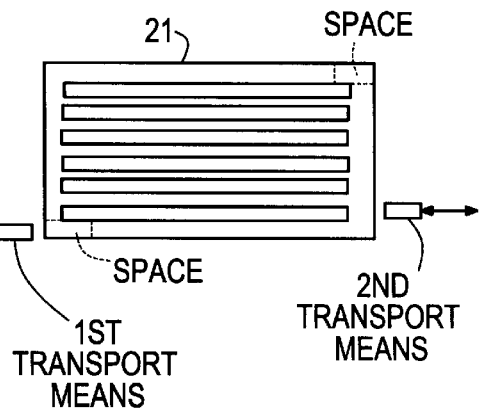
FIG. 20(b) is a schematic diagram showing the partial outline structure of the recorded medium reproducing apparatus.
FIG. 20(c) is a diagram showing another state of the part shown in FIG. 20(b).

The stocker 21 is moved up and down in order to align a desired disk with a pull-out height of the first or second transport means. As shown in FIG. 20(a), the first transport means is disposed lower than the second transport by one stage of disk in the stocker 21. FIG. 20(b) shows the state wherein the stocker 21 is moved to the lowest position. In this state, the first transport means couples to the uppermost disk, and the second transport means is at the position corresponding to an upper space of the stocker 21. FIG. 20(c) shows the state wherein the stocker 21 is moved to the highest position. In this state, the second transport means couples to the lowermost disk, and the first transport means is at the position corresponding to a lower space of the stocker 21. Although the stocker 21 has six stages of shelves for housing disks, it is driven by a stroke corresponding to seven stages of disks.

Reproducing means is driven in an up/down direction. As a disk is transported by the second transport means to a reproducing position, the reproducing means rises to clamp the disk between a turntable and a clamper. Then, the disk is rotated to reproduce it.

In order to confirm a normal position of disks in the stocker 21, a disk position detecting member 26 is provided being inserted into the center holes of disks in the stocker 21, this member 26 being movable up and down and always energized upward by the force of a spring. The up/down stroke of the disk position detecting member 26 corresponds to two stages of disk. When the disk position detecting member 26 is at the lower position, the disk to be transported by the first or second transport means does not interfere with the disk position detecting member 26. After the disk is transported into the stocker 21 by the first or second transport means, the disk position detecting member 26 rises. Disks not inserted with the disk position detecting member 26 are inserted by a member fixed at the higher position than the disk position detecting member 26.

A second motor drives the second transport means and stocker moving means, and a first motor drives the first transport means and disk clamping means of the disk reproducing means. The rotation force of the second motor is switched between the second transport means and the stocker moving means.

The first transport means pulls a disk out of the stocker 21 in the direction opposite to the disk reproducing means. Therefore, irrespective of whether the disk reproducing means holds a disk or not, disks in the stocker 21 can be exchanged or a new disk can to be added to the stocker 21.

Figure 1:
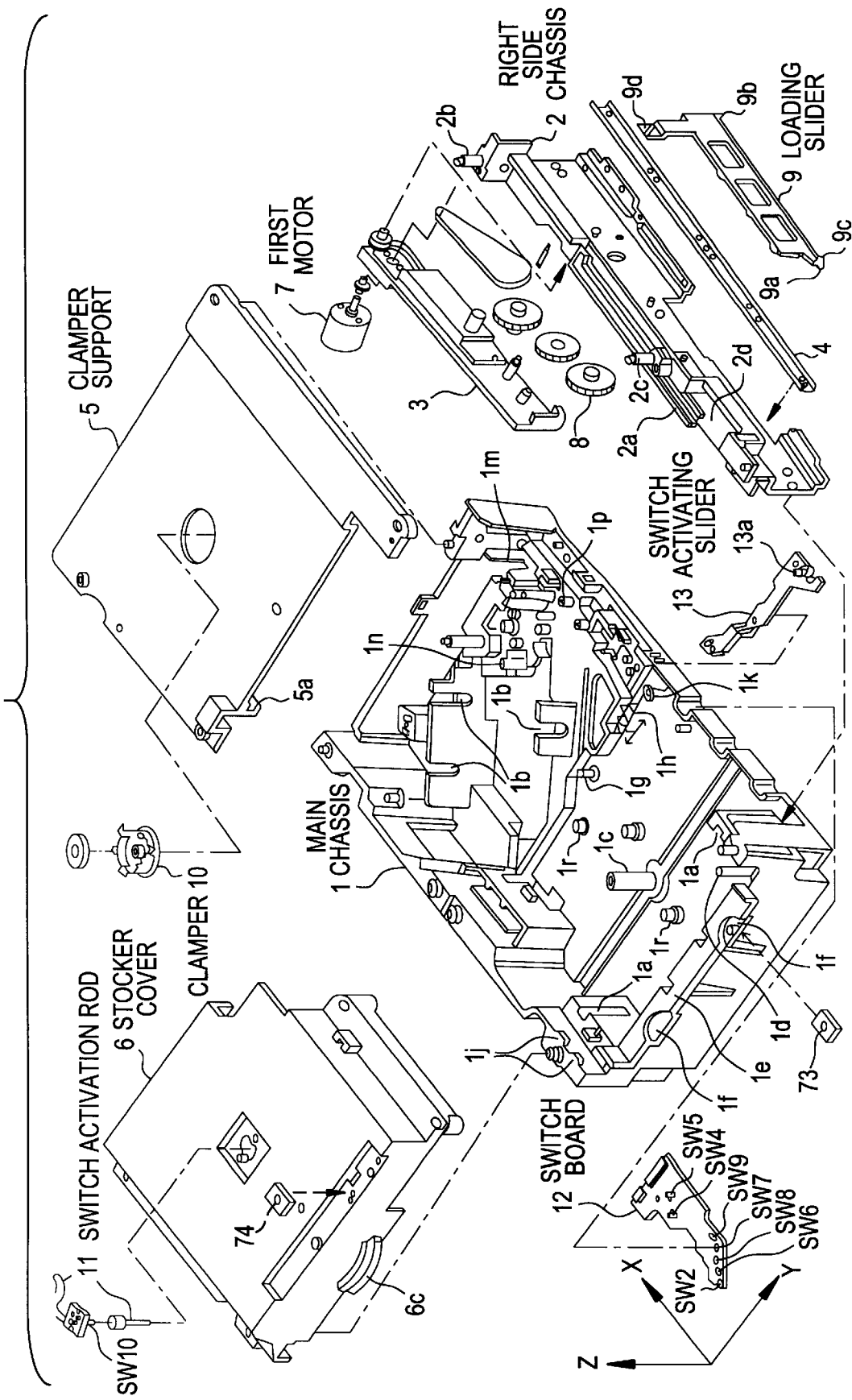
FIG. 1 is a broken perspective view showing part of a recorded medium reproducing apparatus according to an embodiment of the invention.
Figure 2:
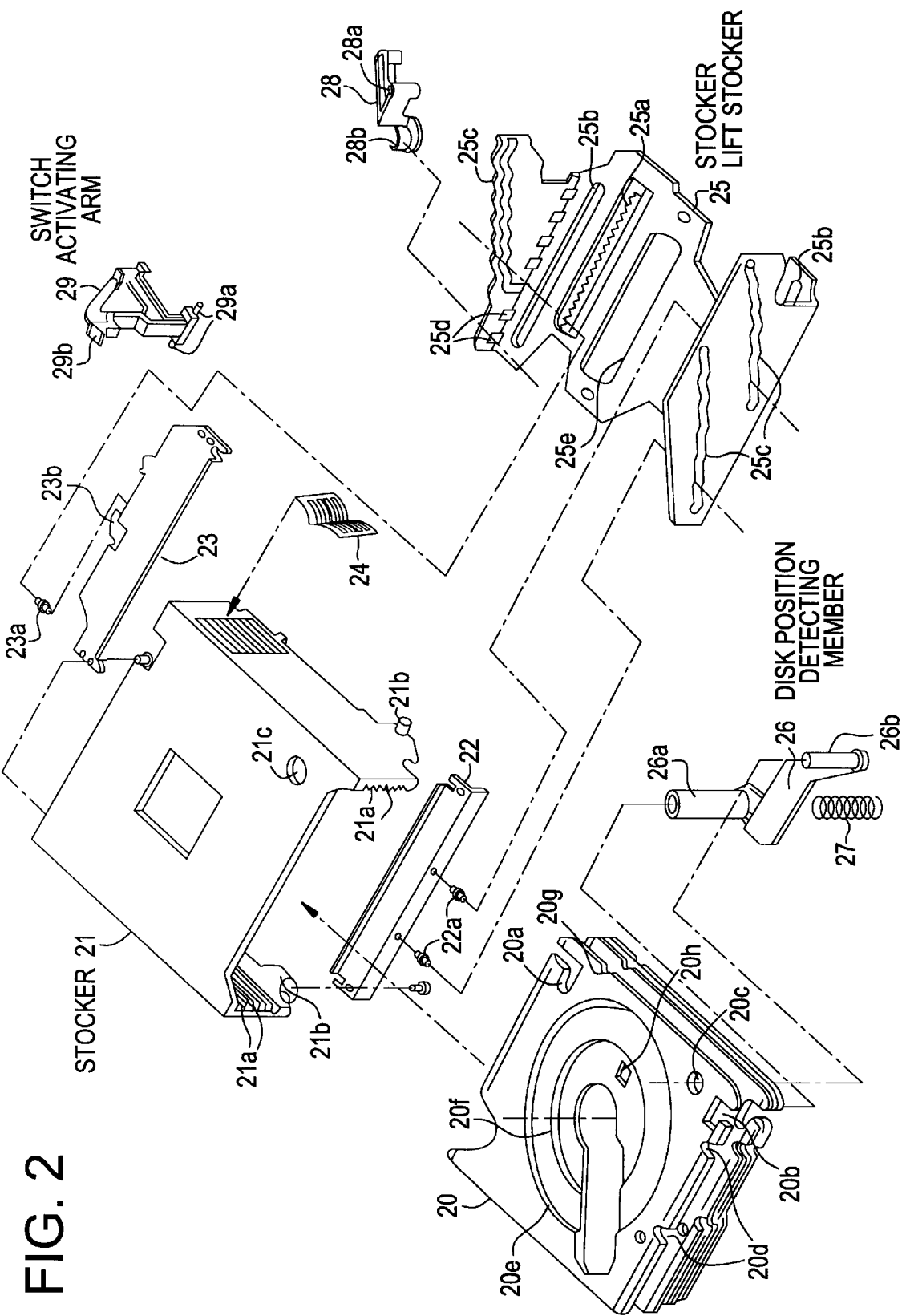
FIG. 2 is a broken perspective view showing part of the recorded medium reproducing apparatus according to the embodiment of the invention.
Figure 3:
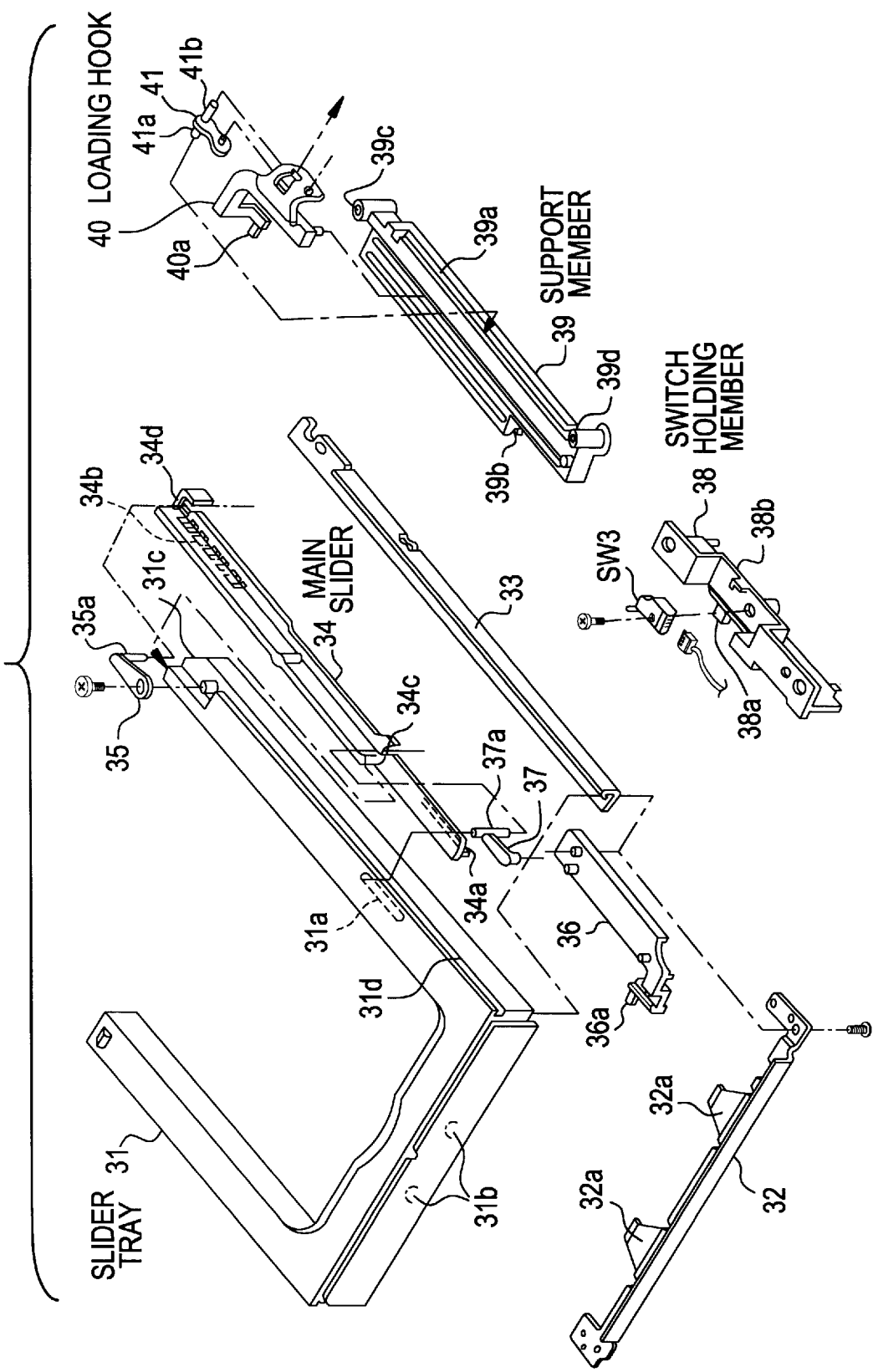
FIG. 3 is a broken perspective view showing part of the recorded medium reproducing apparatus according to the embodiment of the invention.
Figure 4:
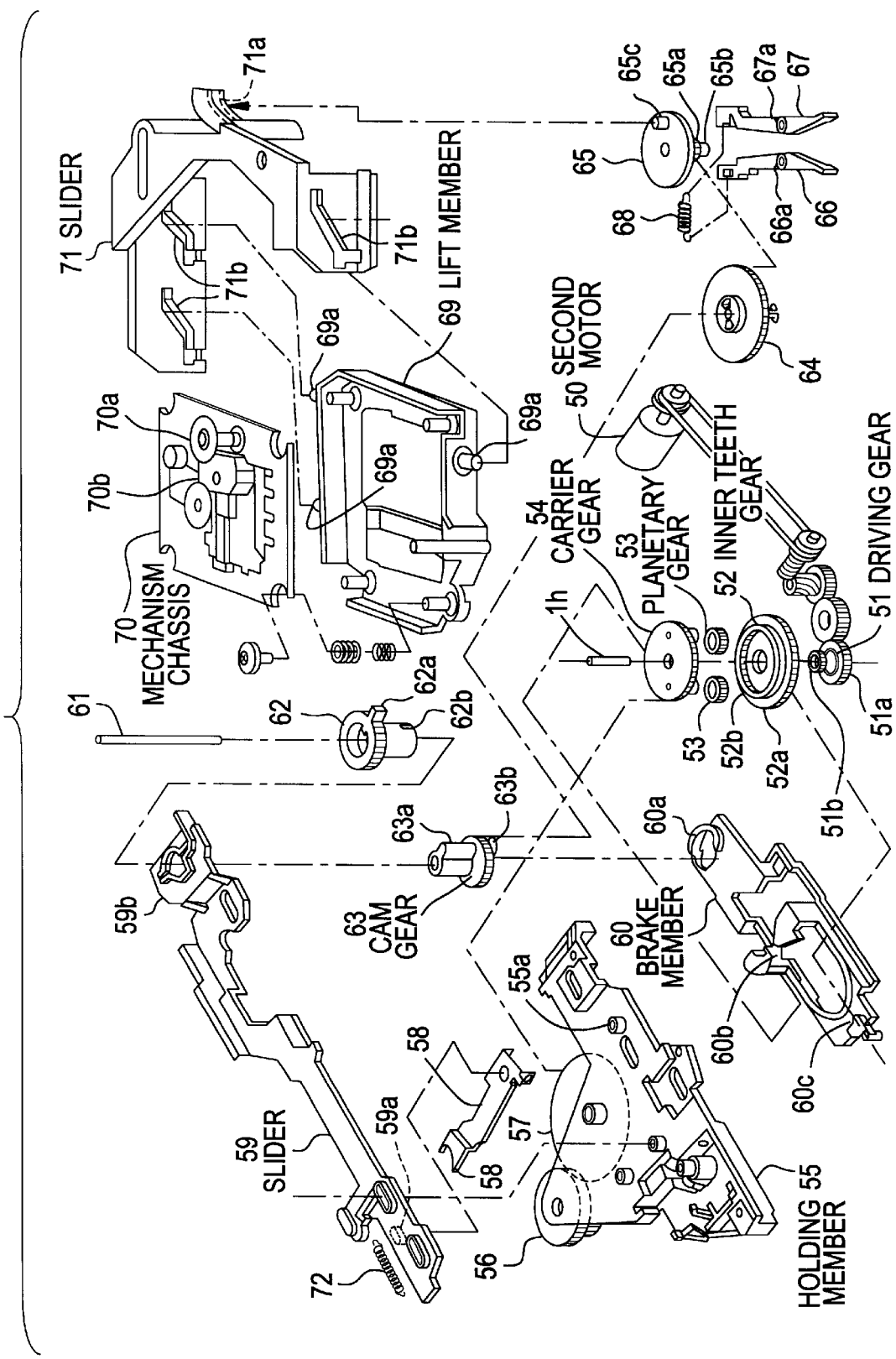
FIG. 4 is a broken perspective view showing part of the recorded medium reproducing apparatus according to the embodiment of the invention.

Next, with reference to FIGS. 1 to 19, the details of the embodiment will be described. FIGS. 1 to 4 are broken perspective views showing parts of a disk reproducing apparatus according to an embodiment of the invention. The positive directions of X-, Y-, and Z-axes shown in FIG. 1 are called in the following description, back, right, and up directions, respectively. The relative postures of each component shown in FIGS. 2 to 4 are the same as those shown in FIG. 1.

A main chassis 1 shown in FIG. 1 supports all components shown in FIGS. 1 to 4. A right side chassis 2 is fixed to the right side of the main chassis 1. A gear train support member 3 and a guide plate 4 are fixed to the right side chassis 2. A first motor 7 is fixedly mounted on the gear train support member 3. The gear train support member 3 supports a transmission mechanism constituted of belts and idler gears.

The transmission mechanism transmits a rotation force of the first motor 7 to a gear 8 supported by the gear train support member 3. A damper support member 5 is fixed to the upper back to surface of the main chassis 1 and holds a clamper 10 rotatively. A guide groove 5a for guiding a carrier shown in FIG. 2 is formed in the left side inner wall of the clamper support member 5. Switches SW2, and SW4 to SW9 are mounted on a switch board 12 which is fixed to the bottom surface of the main chassis 1.

Figure 5:
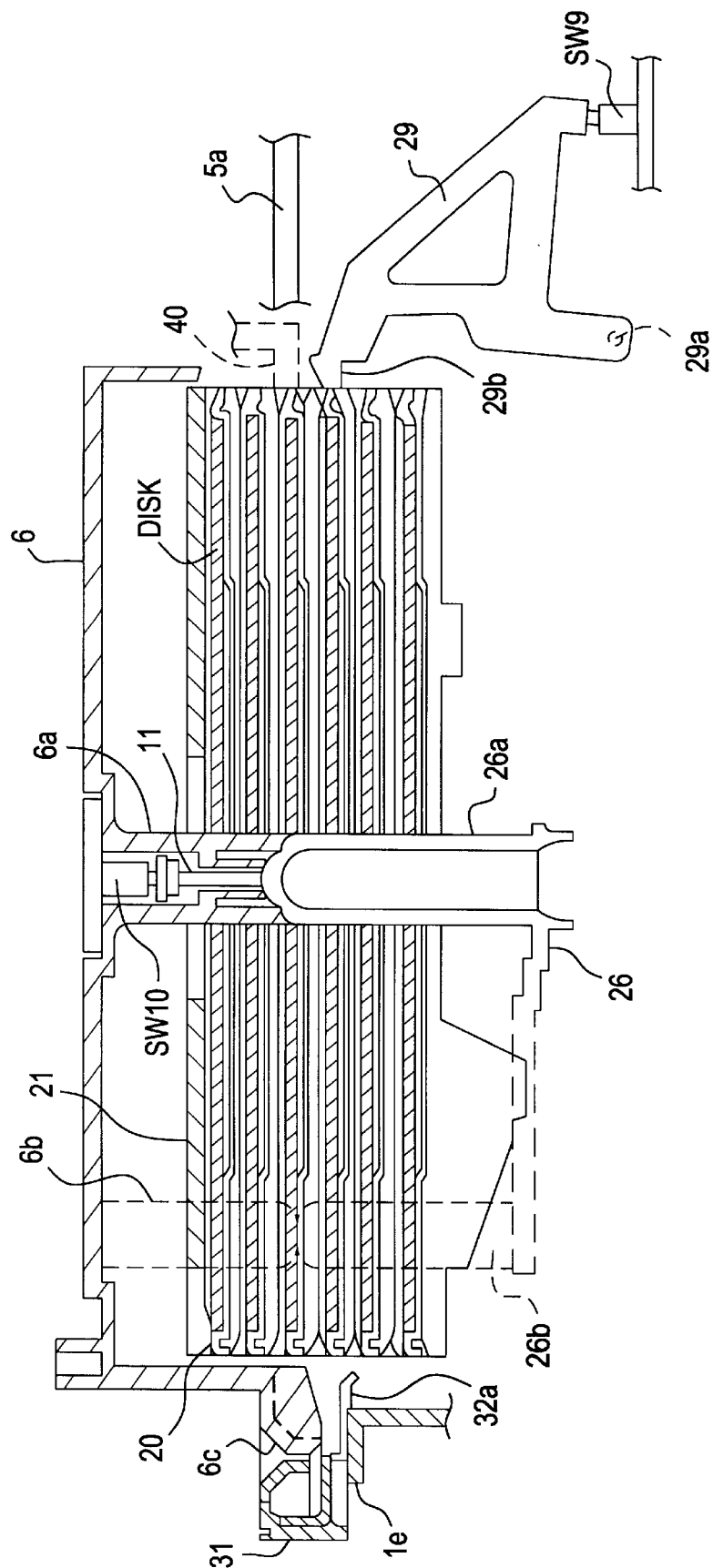
FIG. 5 is a cross sectional view showing part of the recorded medium reproducing apparatus according to the embodiment of the invention, the cross section being stepwise so as to take the view along the centers of a stocker cover 6 and a disk position detecting member 26.
Figure 6:
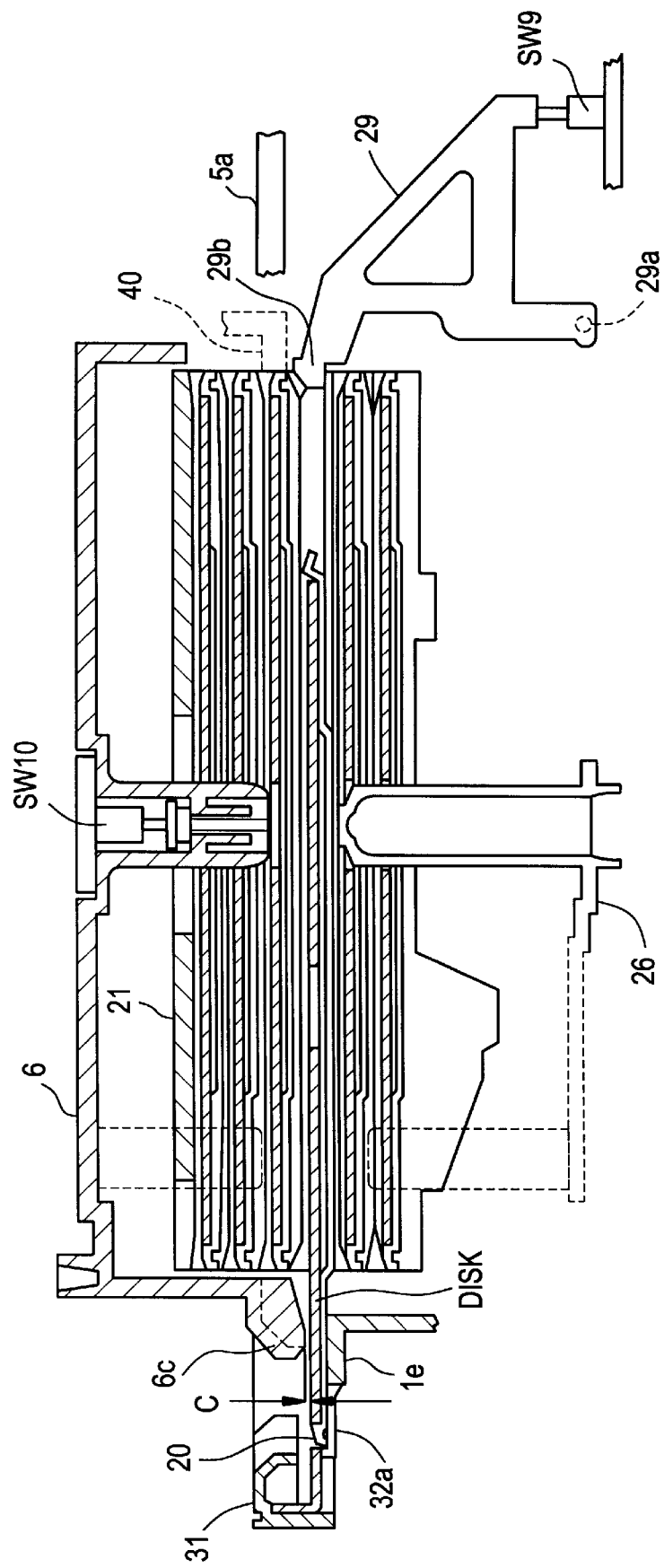
FIG. 6 is a cross sectional view showing another state of the portion shown in FIG. 5.

A stocker cover 6 for covering the upper portion of the stocker 21 shown in FIG. 2 is fixed to the upper front surface of the main chassis 1. The positional relationship between the stocker cover 6 and stocker 21 is detailed in FIGS. 5 and 6. FIG. 5 is a cross sectional view showing the state that all carriers 20 are housed in the stocker 21. FIG. 6 is a cross sectional view showing the state that a carrier 20 is partially pulled out of the stocker 21. As shown, a switch activating rod 11 is supported movably up and down by a cylindrical portion 6a extending downward from the central area of the stocker cover 6. A switch SW10 is fixed to the stocker cover 6 via a board, facing the switch activating rod 11.

At the right front of the stocker cover 6, a stopper rod 6b is provided at the position corresponding to a hole 21c of the stocker 21 shown in FIG. 2. The height of the lower end of the stopper rod 6b is generally flush with the height of the lower end of the cylindrical portion 6a. A stopper portion 6c is provided at the lower front of the stocker cover 6. A light receiving element 74 is mounted via a board on the stopper cover 6. A light emitting element 73 projecting light toward the light receiving element 74 is mounted via a substrate on the main chassis 1.

Figure 14A:
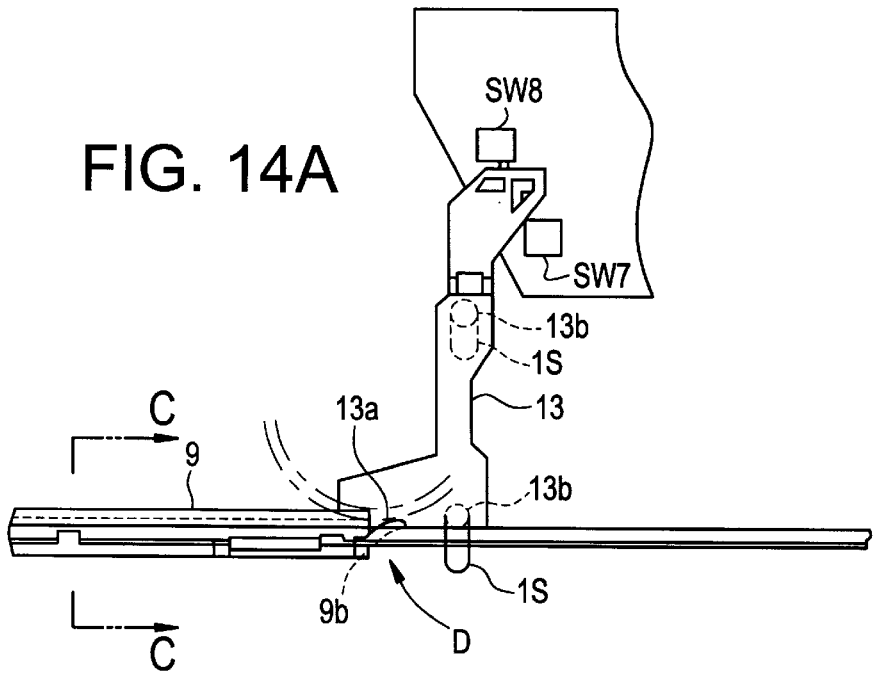
FIGS. 14(a) and 14(b) are partial plan views illustrating the operation of the recorded medium reproducing apparatus according to the embodiment of the invention.
Figure 14B:
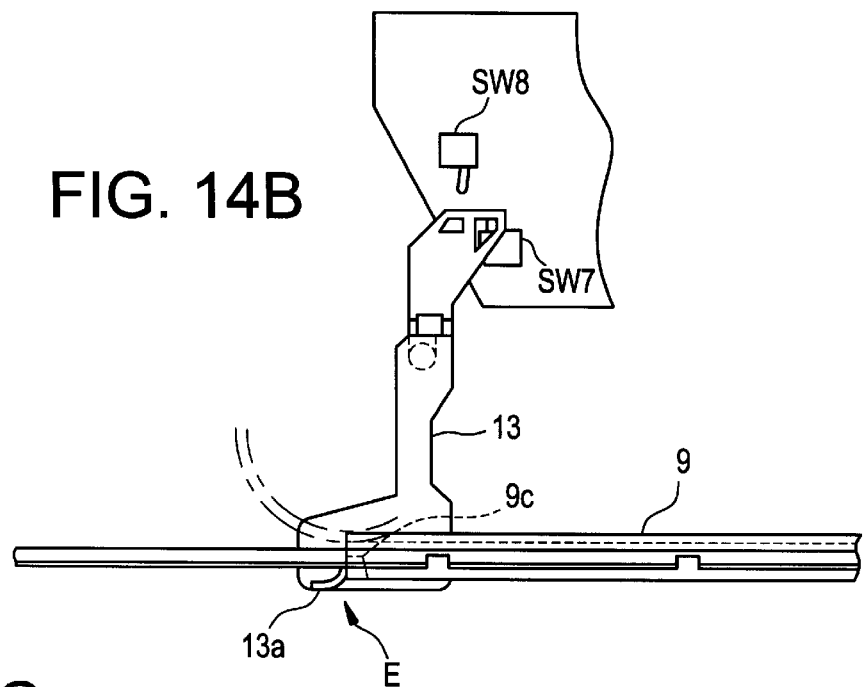
Figure 14C:
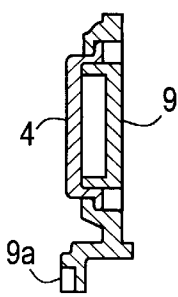
FIG. 14(c) is a cross sectional view taken along line C—C of FIG. 14(a)
Figure 14D:
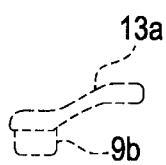
FIG. 14(d) shows the details of a D portion shown in FIG. 14(a)
Figure 14E:
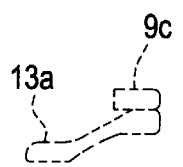
FIG. 14(e) shows the details of an E portion shown in FIG. 14(b).

As detailed in FIG. 14(c), a loading slider 9 engages with a guide plate 4 and is supported by the guide plate 4 to become capable of sliding back and forth. At the lower left side of the loading slider 9, a rack 9a is mounted which meshes with outer teeth 52a of an inner teeth gear 52 shown in FIGS. 4 and 15. The rack 9a meshes with the inner teeth gear 52 so that the loading slider 9 is driven in back and forth directions upon rotation of the inner teeth gear 52. As shown in FIG. 14(a), projections 13a, 13a of a switch activating slider 13 engage with elongated holes 1s, 1s of the main chassis 1. The switch activating slider 13 is supported movably right and left by the main chassis 1. As shown in FIGS. 14(a), 14(d), 14(b), and 14(e) in detail, the projections 13a of the switch activating slider 13 abut against projections 9b, 9c of the loading slider 9. As shown in FIGS. 14(a) and 14(d), as the loading slider 9 moves forward, i.e., toward the carrier housing position, the projection 9b of the loading slider 9 pushes via the projection 13a the switch activating slider 13 to the left to activate the switch SW8. As shown in FIGS. 14(b) and 14(e), as the loading slider 9 moves backward, i.e., toward the loading position, the projection 9c of the loading slider 13 pushes via the projection 13a the switch activating slider 13 to the right to activate the switch SW7. While the projection 9b or 9c of the loading slider 9 does not push the projection 13a of the switch activating slider 12, the switch activating slider 13 is at an intermediate position because it is pushed by the switches SW7 and SW8.

The carrier 20 shown in FIG. 2 can place thereon a disk with its position being alignment by a large diameter disk recess 20e or small diameter disk recess 20f. A hole 20c is formed at the outer position of the large diameter recess 20e of the carrier 20. This hole 20c is formed at the position corresponding to a hole 21c of the stocker 21 when the carrier 20 is housed in the stocker 21. Therefore, the above-described stopper rod 6b of the stocker cover 6 is inserted into the hole 20c of the carrier 20 via the hole 21c of the stocker 21. Grooves 21a, 21a, . . . formed in the inner wall of the stocker 21 support the carriers 20, the stocker 21 housing six carriers 20. As stated earlier, the stocker 21 has the hole 21c formed at the position corresponding to the hole 20c of the carrier 20 in the stocker 21. A hole 20h is partially formed in the small diameter disk recess 20f of the carrier 20. As will be later described, this hole 20h allows light from the light emitting element 73 to pass therethrough while the carrier 20 moves from the outside of the housing to the inside of the stocker 21.

A plate spring 24 fixed to the stocker 21 shown in FIG. 2 engages with a recess 20g of the carrier 20 to thereby lightly position the carrier 20. A first hook engaging notch 20b of the carrier 20 engages with a first hook 36a of a carrier pull-out member 36 shown in FIG. 3. Therefore, the carrier 20 can be transported by the carrier pull-out member 36 between the stocker 21 and the outside of the housing.

A second hook engaging notch 20a of the carrier 20 engages with a second hook 40a of a loading hook 40 shown in FIG. 3. Therefore, the carrier 20 can be transported by the loading hook 40 between the stocker 21 and the reproducing position. The carrier pull-out member 36 and its drive mechanism constitute the first transport means, and the loading hook 40 and its drive mechanism constitute the second transport means.

Shafts 21b, 21b of the stocker 21 are fitted in vertical grooves 1a, 1a formed in the main chassis 1. A front plate 22 and a back plate 23 are fixed to the lower portion of the stocker 21. Shafts 22a, 22a are mounted upright on the front plate 22. A shaft 23a is mounted upright on the back plate 23, and a tongue 23b is provided.

A guide rod 1c of the main chassis 1 is inserted into an elongated hole 25e of a stocker lift slider 25, and shafts 1r, 1r of the main chassis 1 are inserted into grooves 25b, 25b. Therefore, the stocker lift slider 25 is supported by the main chassis 1 to become capable of sliding right and left. The stocker lift slider 25 is provided with stepwise grooves 25c, 25c, . . . having seven horizontal portions and a rack 25a.

Figure 15:
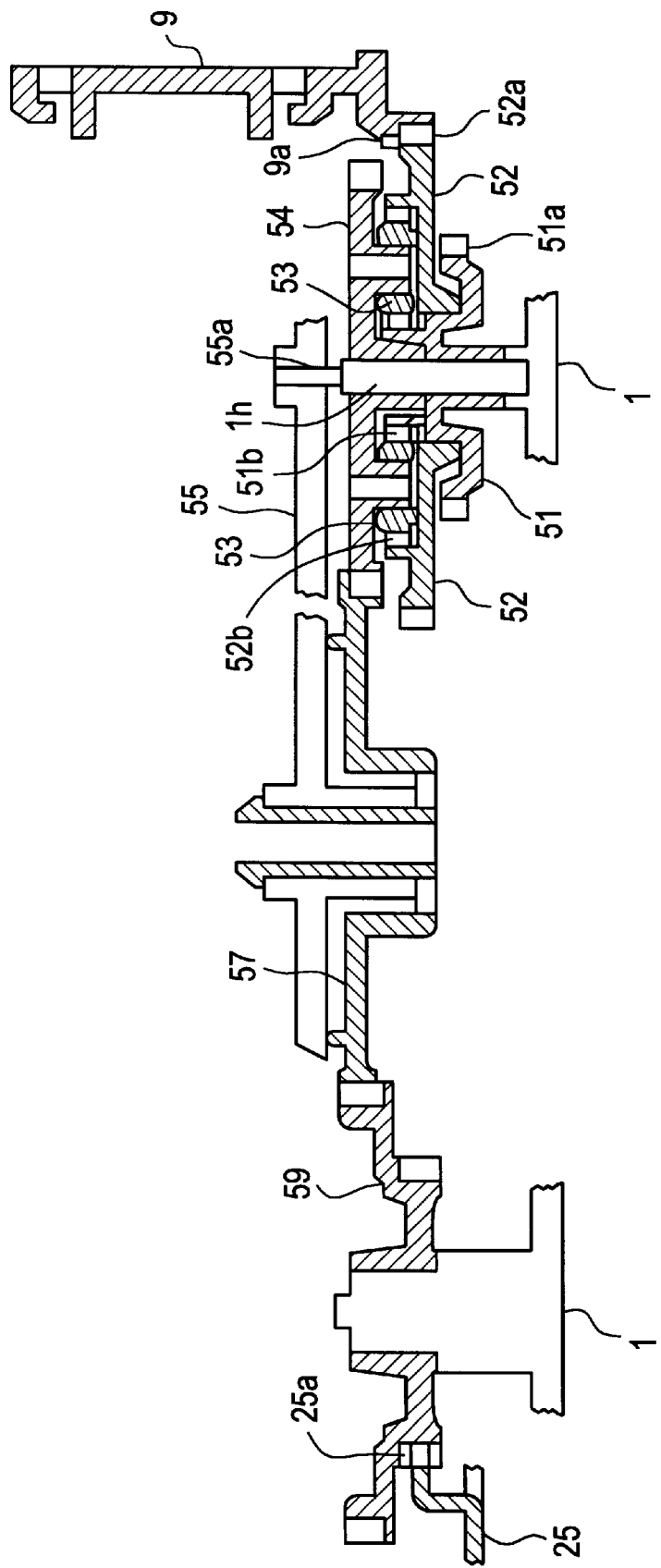
FIG. 15 is a cross sectional view taken along the centers of gears, illustrating a meshing relationship between gears of the recorded medium reproducing apparatus according to the embodiment of the invention.

The rack 25a of the stocker lift slider 25 meshes with a gear 56 shown in FIGS. 4 and 15. The shafts 22a, 22a of the front plate 22 and the shaft 23a of the back plate 23 are inserted into the stepwise grooves 25c, 25c, . . . . Specifically, as the gear 56 rotates, the stocker lift slider 25 moves to make the stocker 21 move up and down. The stocker lift slider 25 and its drive mechanism constitute stocker transport means.

When the stocker 21 is at the home position which is the lowest position, the tongue 23b activates the switch SW2. In this state, the carrier 20 on the shelf of the stocker 21 at the uppermost stage is at the position where the carrier 20 is moved to the outside of the housing by the carrier pull-out member 36. Whether there is a carrier 20 at the position (in this case, on the shelf at the uppermost stage) corresponding to the carrier pull-out member 36 can be detected by the switch SW9 to be later described. Also in this state, a loading hook 40 is at the upper space over the uppermost stage.

A switch activating arm 28 is supported rotatively via its hole 28a by a shaft 1g of the main chassis 1. The right side end of the switch activating arm 28 abuts against the switch SW6. The switch activating arm 28 is pushed by the switch SW6 and energized in the counter-clockwise direction. A projection 28b of the switch activating arm 28 is at the position corresponding to holes 25d, 25d, . . . of the stocker lift slider 25. As the stocker lift slider 25 moves and each time it passes near the hole 25d, the projection 28b enters the hole 25d so that the switch activating arm 28 swings. The switch SW6 turns on and off each time the stocker lift slider 25 passes near the hole 25d.

A pitch between the holes 25d and 25d is equal to a motion distance of the carrier by one stage. The position of the stocker 21 at the lowermost position is represented by "0", and while the stocker 21 is raised, the stocker position is counted up each time the switch SW6 turns on and off, whereas while the stocker 21 is lowered, the stocker position is counted down each time the switch SW6 turns on and off. In this manner, a control circuit can store the position of the stocker 21.

The stocker can be raised to a height corresponding to seven shelf stages from the home position. When the to stocker is at the uppermost position, the lowermost shelf is at the position where a carrier can be pulled into and out of the stocker by the loading hook 40. Specifically, the carrier pull-out member 36 is at the lower space under the lowermost shelf. As described earlier, in order to temporarily stop the stocker when the shelf at each stage of the stocker is at the height position corresponding to the loading hook 40 and carrier pull-out member 36, the seven horizontal portions are formed on the stepwise groove 25c of the stocker lift slider 25.

The disk position detecting member 26 has rod-like protrusions 26a and 26b whose insides are hollow portions opening at the bottoms. The guide rods 1c and 1d of the main chassis 1 shown in FIG. 1 engage with the hollow portions of the rod-like protrusions 26a and 26b so that the disk position detecting member 26 can move up and down.

A compression coil spring 27 squeezed between the main chassis 1 and disk position detecting member 26 energizes upward the disk position detecting member 26. A recess 58a formed at the end portion of an arm 58 shown in FIG. 4 couples to the base portion of the rod-like protrusion 26a of the disk position detecting member 26. The arm 58 makes the disk position detecting member 26 move up and down. FIG. 5 shows the state that the disk position detecting member 26 is at the raised position, and FIG. 6 shows the state that the disk position detecting member 26 is at the lowered position.

As the disk position detecting member 26 rises, the switch activating rod 11 activates the switch SW10. The rod-like protrusion 26a is inserted into the center holes of disks in the stocker 21, and the rod-like protrusion 26b is inserted into the holes 20c of the carriers 20 in the stocker 21.

A switch activating arm 29 shown in FIGS. 2, 5, and 6 is rotatively supported via its shaft 29a by a boss 1h formed on the main chassis 1 at the central bottom surface on the slightly right side thereof, the lower back portion of the switch activating arm 29 abutting against the switch SW9 and being energized by this switch SW9. A protrusion 29b of the switch activating arm 29 is at the position corresponding to the stage where the carrier pull-out member 36 pulls out the carrier 20, and is in contact with the back portion of the carrier 20 at this position.

The switch activating arm 29 therefore rotates when the carrier 20 is pulled out of the stocker or moved back to the stocker, and turns on and off the switch SW9 which detects that the carrier 20 is moved back to the stocker 21 by the carrier pull-out member 36. The switch SW9 also detects whether there is a carrier at the stage where the carrier pull-out member 36 operates.

A switch holding member 38 shown in FIG. 3 is fixed in such a manner that a channel-shaped projection 38b formed on the bottom of the member 38 is fitted in a channel-shaped recess 2d formed on the front portion of the right side chassis 2 shown in FIG. 1. A slider tray 31 is supported by the main chassis 1 and switch holding member 38 to become capable of sliding back and forth. Specifically, the projection 38a of the switch holding member 38 engages with a groove 31d formed in the right side wall of the slider tray 31, and a projection 1j formed in the left side wall of the main chassis 1 engages with a groove 31e formed in the left side wall of the slider tray 31.

Figure 7:
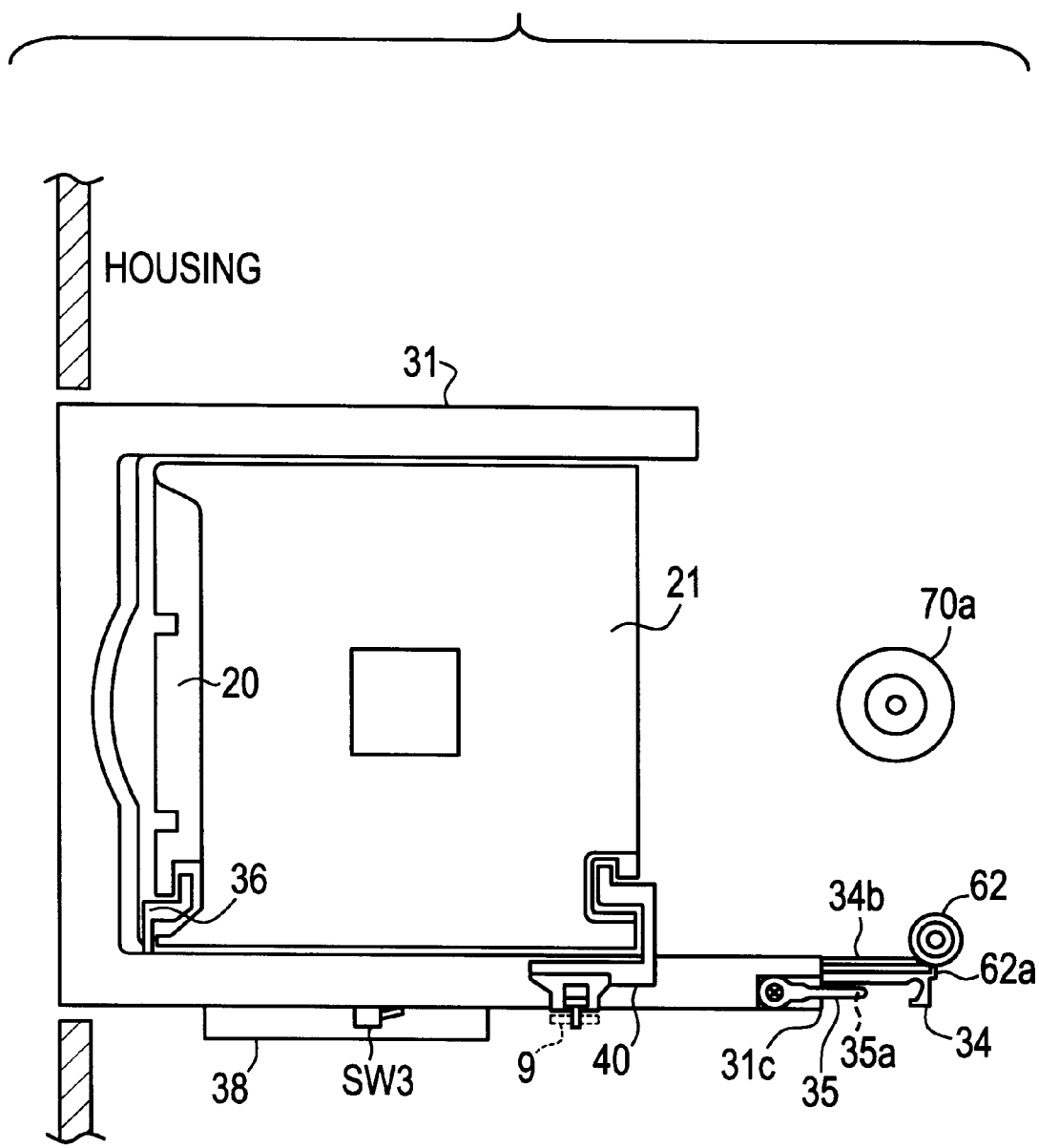
FIG. 7 is a plan view showing part of the recorded medium reproducing apparatus according to the embodiment of the invention.
Figure 8:
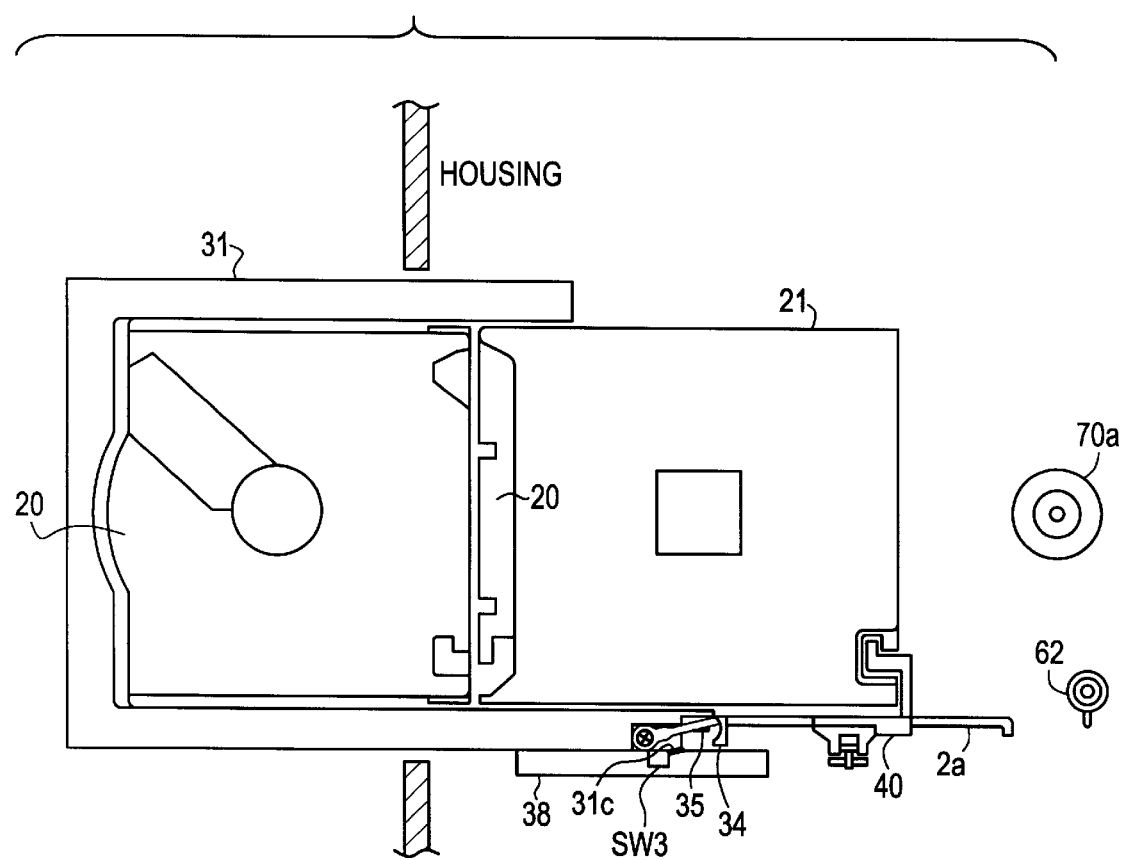
FIG. 8 is a plan view showing another state of the portion shown in FIG. 7.

The positional relationship between the slider tray 31 and stocker 21 is shown in FIGS. 7 and 8. FIG. 7 shows the state that the carrier 20 is in the housing, and FIG. 8 shows the state that the carrier is out of the housing. As shown, the slider tray 31 is formed and disposed so as to sandwich the stocker between the right and left sides thereof. Therefore, the slider tray 31 can form therein grooves 31e and 31d serving as a support portion long in the right and left direction. The stocker can therefore be supported stably to become capable of sliding back and forth, and as will be later described, a main slider 34 and carrier pull-out member 36 can be stably supported. Furthermore, since the slider tray 31 accommodated in the housing surrounds the stocker 21 when the slider 31 is accommodated in the housing, a stroke of the slider tray 31 can be made large in a narrow space so that the carrier 20 can be pulled out a long distance.

An operating piece of the switch SW3 fixed to the switch holding member 38 is pushed to the right side surface of the slider tray 31, when the slider tray 31 is accommodated in the housing as shown in FIG. 7 or while it is transported during a motion stroke to the outside of the housing (to the front direction). As shown in FIG. 8, at the end of the motion stroke of the slider tray 31 to the outside of the housing, a slanted back portion 31c of the slider tray 31 faces the operating piece of the switch SW3 to release the pressure of the operating piece. Namely, the switch SW3 detects the open position of the slider tray 31.

A guide plate 33 shown in FIG. 3 is fixed to the bottom of the slider tray 31. The guide plate 33 and slider tray 31 support the guide plate 33 and slider tray 31 to be made capable of moving back and forth, by sandwiching the guide plate 33 and slider tray 31.

A rack 34a is formed on the bottom of the main slider 34 in the back and forth direction. The rack 34a meshes with the gear 8 shown in FIG. 1. Therefore, as the first motor 7 rotates in the normal and reverse directions, the main slider 34 moves back and forth. The main slider 34 moves the slider tray 31 and carrier pull-out member 36 and rotates a gear 62 shown in FIGS. 4, 7, and 8.

Specifically, as the main slider 34 moves back, the slider tray 31 can be moved to the inside of the housing. The main slider 34 can move back further after the slider tray is moved to the inside of the housing. The main slider 34 moved back further rotates a gear 62 shown in FIGS. 4, 7, and 8.

The carrier pull-out member 36 shown in FIGS. 3 and FIGS. 9 to 11 rotatively supports a rotary member 37. The shaft 37a of the rotary member 37 engages with a J-shaped groove 31a of the slider tray 31 and can engage also with a recess 34c of the main slider 34.

The slider tray 31 shown in FIGS. 3 and FIGS. 9 to 11 rotatively supports a rotary member 35. The shaft 35a of the rotary member 35 engages with a J-shaped groove 2a of the right side chassis 2 shown in FIG. 1 and can engage also with a recess 34d of the main slider 34.

Figure 9:
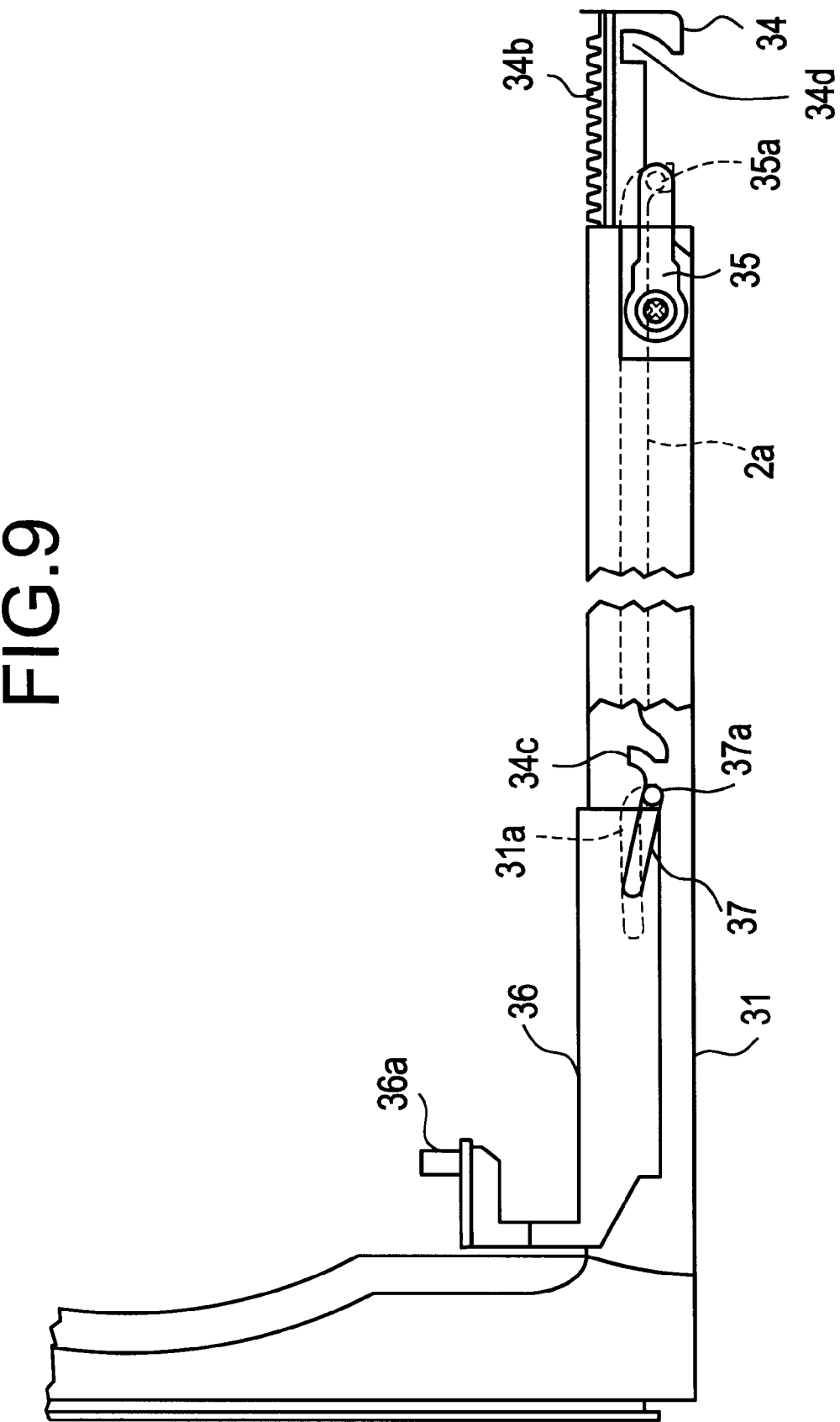
FIG. 9 is a plan view partially broken showing part of the recorded medium reproducing apparatus according to the embodiment of the invention.
Figure 10:
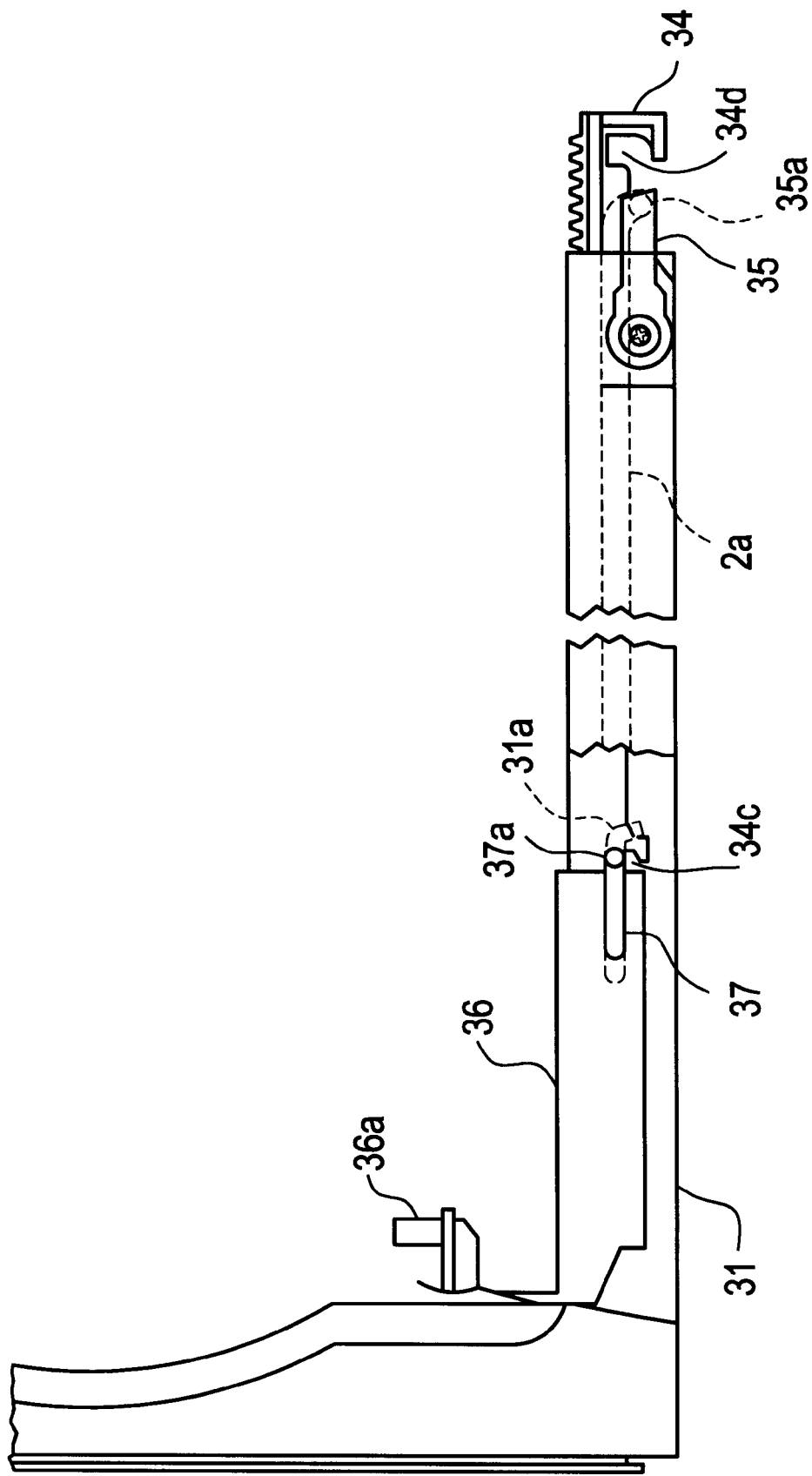
FIG. 10 is a plan view showing another state of the portion shown in FIG. 9.
Figure 11:
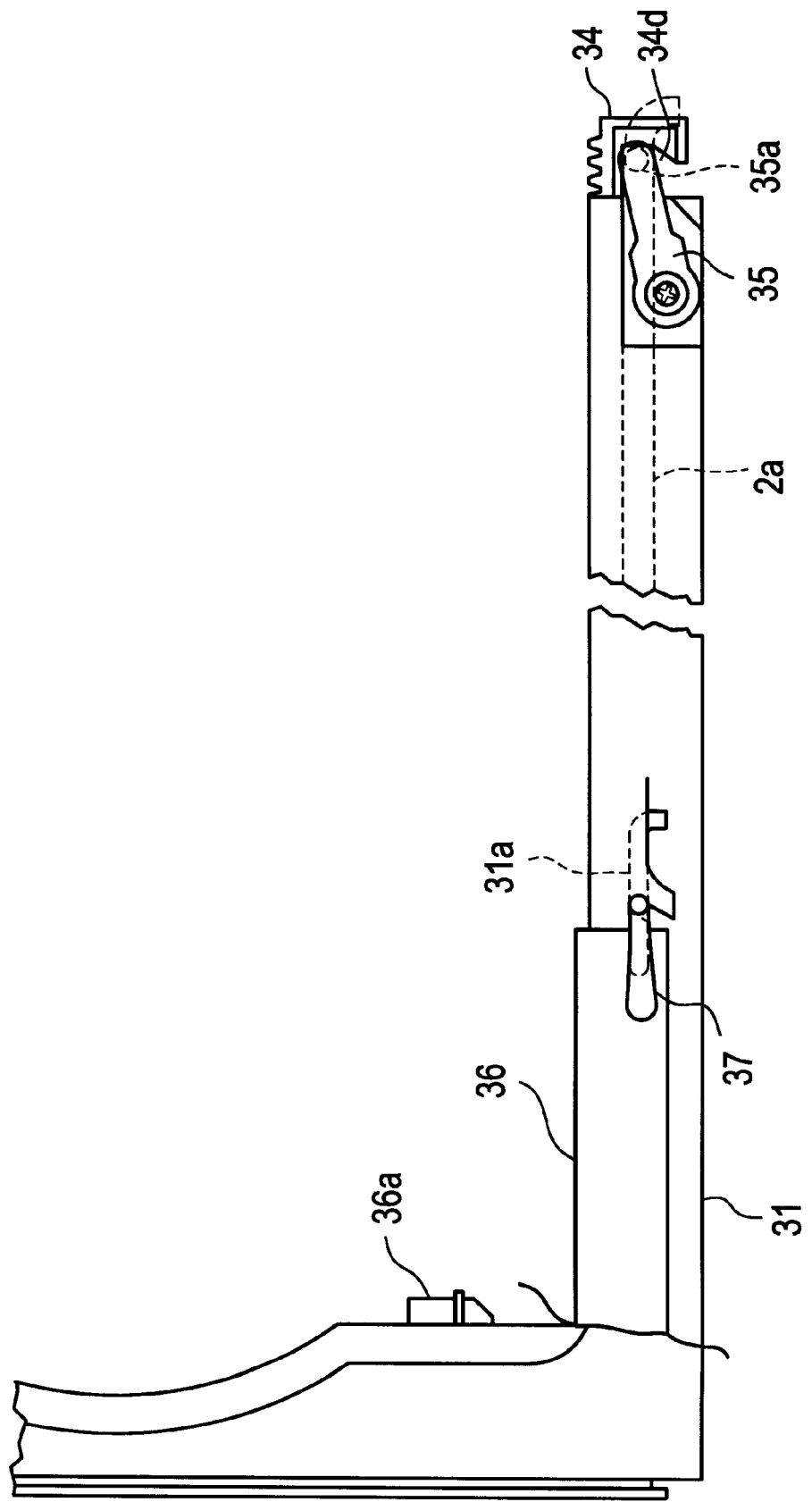
FIG. 11 is a plan view showing another state of the portion shown in FIG. 9.

FIGS. 9 to 11 show a change in the relationship of the relative position of the main slider 34, slider tray 31, and carrier pull-out member 36. As shown in FIG. 9, while the main slider 34 moves back, the shaft 37a engages with the right protrusion of the J-shaped groove 31a and does not engage with the recess 34c. Therefore, the main slider 34 does not drive the carrier pull-out member 36. Also in this case, the shaft 35a engages with the right protrusion of the J-shaped groove 2a and does not engage with the recess 34d. Therefore, the main slider 34 does not drive the slider tray 31. Namely, in the state shown in FIG. 9, although the main slider 34 moves, the carrier pullout member 36 and main slider 34 will not move.

As the main slider 34 moves forth to the position shown in FIG. 10, the recess 34c makes the shaft 37a enter therein, the shaft 37a engages with a straight portion of the J-shaped groove 31a, and the carrier pull-out member 36 is driven. In this state, the main slider 34 is not moved as yet.

As the main slider 34 moves forth to the position shown in FIG. 11, the recess 34d makes the shaft 35a enter therein, the shaft 35a engages with a straight portion of the J-shaped groove 2a, and the slider carrier pull-out member 36 is driven. The main slider 34 first moves forth to thereafter move forth the slider tray 31 along with the carrier pull-out member 36.

As the carrier pull-out member 36 moves forth, the carrier 20 in the stocker 21 is pulled forth to place the end portion thereof on tongues 32a and 32a of a lower plate 32 fixed to the slider tray 31. FIG. 6 to shows the state that the carrier 20 is placed on the tongues 32a and 32a of the lower plate 32. As shown in FIG. 6, in the state while the carrier 20 is pulled out of the stocker 21 toward the outside of the housing, a distance C between the disk on the carrier 20 and the stopper portion 6c of the stocker cover 6 is made smaller than the thickness of the disk.

In the state that the slider tray 31 is in the housing, the tongues 32a and 32a are fitted in recesses 1f and 1f formed in the upper frame 1e of the main chassis 1 and are near at the carrier 20 in the stocker 21. As the carrier 20 is pulled out in the above manner, recesses 20d and 20d at the top end of the carrier 20 engage with protrusions 31b and 31b of the slider tray 31 so that the right and left positions at the top end of the carrier 20 can be fixed. The rear portion of the carrier 20 is supported by the upper frame 1e of the main chassis 1, and the right and left positions of the carrier 20 are determined by the right and left vertical surfaces of the upper frame 1e.

A shaft 61 shown in FIG. 4 is supported by being fitted in a hole 1p formed in the bottom of the main chassis shown in FIG. 1 and in a hole formed on the left bottom on a slightly back side of a support member 39 shown in FIG. 3. The shaft 61 rotatively supports a cam gear 63 and the gear 62. A protrusion 63a of the cam gear 63 is fitted in a recess 62b of the gear 62 so that the cam gear 63 and gear 62 rotate together. As described previously, the gear 62 is rotated by the main slider 34.

FIG. 7 shows the state that the main slider 34 starts rotating the gear 62. As the main slider 34 moves back, its rear end pushes the protrusion 62a of the gear 62 so that the gear 62 rotates and meshes with the rack 34b of the main slider 34. Since the positional relationship between the gear 62 and main slider 34 is constant, the gear 62 smoothly meshes with the rack 34b.

The support member 39 show in FIG. 3 is fixed to the right side chassis 2 in such a manner that shafts 2b and 2c of the right side chassis 2 are fitted in holes 39c and 39d of the support member 39. A guide groove is formed in the left side wall of the support member 39 for guiding the carrier 20 together with the guide groove 5a of the clamper holding member 5 described previously with reference to FIG. 1. A rotary member 41 is rotatively supported by the loading hook 40. The shaft 41a of the rotary member 41 engages with the L-shaped groove 39a of a support member 39. The shaft 41b engages with a slanted groove 8d of the loading slider 9 shown in FIG. 1. In the above manner, the loading hook 40 is supported by the support member 39 and loading slider 9 to be movable back and forth. FIGS. 12(a) and 12(b) show an assembly state of the support member 39, loading slider 9, loading hook 40, and rotary member 41.

Figure 13A:
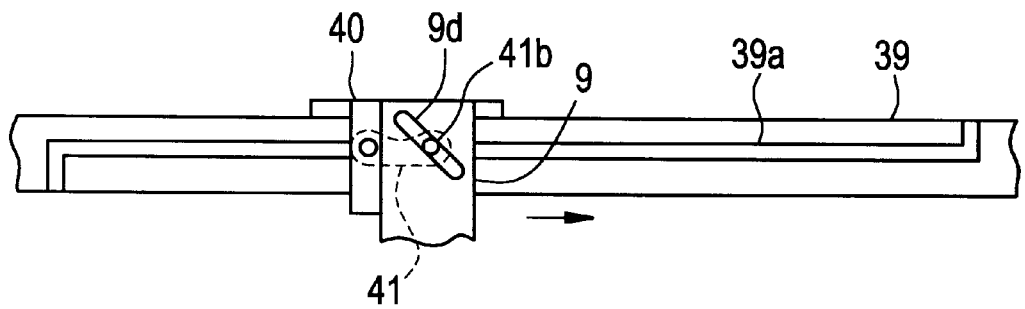
FIGS. 13(a) to 13(c) are partial side views illustrating the operation of the recorded medium reproducing apparatus according to the embodiment of the invention.
Figure 13B:
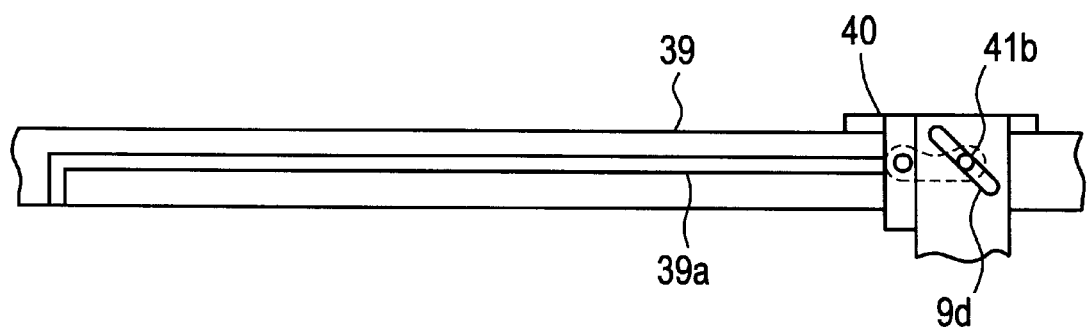
Figure 13C:
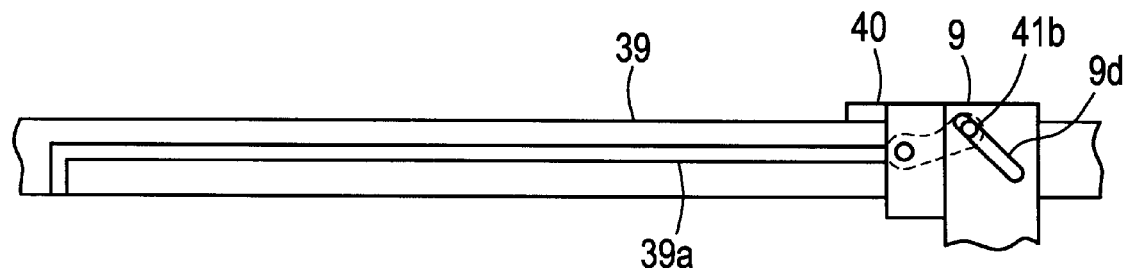

FIGS. 13(a) to 13(c) show the state that the loading slider 9 drives the loading hook 40. FIG. 13(a) shows the intermediate drive state of the loading hook 40. In this state, the shaft 41a (hidden by the shaft 41b) engages with the horizontal portion of the L-shaped groove 39a, the rotary member 41 does not rotate, and the loading hook 40 moves together with the loading slider 9.

FIG. 13(b) shows the state that the shaft 41a engages with the end of the horizontal portion of the L-shaped groove 39a, and FIG. 13(c) shows the state that the loading slider 9 is at the end of the motion stroke. While the loading slider 9 moves from the position shown in FIG. 13(b) to the position shown in FIG. 13(c), the rotary member 41 rotates and the loading hook 40 moves less. Even if the loading slider 9 bounds and the motion position changes, the stop position of the loading hook 40 is stabilized.

As described earlier, the second hook engaging notch 20a of the carrier 20 engages with the second hook 40a of the loading hook 40. Therefore, as the loading hook 40 moves back, the carrier 20 in the stocker 21 is pulled out by the loading hook 40. The carrier is guided by the guide groove 5a of the clamper support member 5 previously described with FIGS. 1 and 3 and the guide groove 39b of the support member 39, and transported to the position just above the turntable 70a shown in FIG. 4 and FIGS. 7 and 8, i.e., to the loading position. As above, since the carrier 20 is guided by the members fixed to the main chassis 1, it does not vibrate during transportation and can be pulled in the guide portions reliably.

The carrier 20 is transported between the stocker 21 and turntable 70a as the loading slider 9 moves as in the above manner. The end of the motion stroke of the loading slider 9 is detected by the switches SW7 and SW8 as previously described with FIG. 14. Both the carrier pull-out member 36 and loading hook 40 pull the carrier 20 out of the stocker 21, and the height positions thereof differ by one stage of carrier as shown in FIGS. 20 and 6 so that the carrier 20 will not be pulled by both the carrier pull-out member 36 and loading hook 40.

A driving gear 51, inner teeth gear 52, and carrier gear 54 shown in FIGS. 4 and 15 are rotatively supported by the shaft 1h. The upper and lower ends of the shaft 1h are supported by a hole 1k of the main chassis 1 shown in FIG. 1 and a hole 55a of a holding member 55 fixed to the main chassis 1. The holding member 55 is fixed to the main chassis 1 in such a manner that the hole 55a faces the hole 1k of the main chassis 1. Planetary gears 53, 53 rotatively supported by the shaft of the carrier gear 54 mesh with the inner teeth 52b of the inner teeth gear 52 and a sun gear 51b formed on the driving gear 51. These gears constitute a planetary gear mechanism.

A second motor 50 is fixed to a boss 1m of the main chassis 1 shown in FIG. 1. A deceleration mechanism driven by the second motor meshes with a large gear 51a of the driving gear 51 so that the second motor 50 rotatively drives the driving gear 51. A rotation force of the second motor 50 is transmitted to the carrier gear 54 while the inner teeth gear 52 stops and to the inner teeth gear 52 while the carrier gear 54 stops.

As described earlier, the outer teeth 52a of the inner teeth gear 52 mesh with the rack 9a of the loading slider 9a (as shown in FIG. 15) to drive the loading slider 9. The carrier gear 54 is coupled to the rack 25a of the stocker lift slider 25 via gears 56 and 57 rotatively supported and sandwiched between the main chassis 1 and holding member 55, to thereby drive the stocker lift slider 25.

A slider 59 shown in FIG. 4 and FIGS. 16 to 18 is supported at the upper portion of the holding member 55 via a plurality of elongated holes extending in the back and forth directions to become capable of sliding back and forth, and is energized forth by an extension is coil spring 72. A cam follower 59b of the slider 59 engages with a protrusion 63a of a cam gear 63, and the slider is driven back and forth by the cam gear 63. A cam-shaped protrusion 59a formed on the bottom of the slider 59 engages with a fringe of an arm 58 rotatively supported by the holding member 55 to rotate the arm 58 as shown in FIGS. 16 to 18.

Specifically, the main slider 34 raises and lowers the disk position detecting member 26 shown in FIG. 2, and raises it while the carrier 20 is not transported into and from the stocker 21. For example, if an 8-cm disk is accommodated in the stocker 21 of the carrier 20 in a displaced manner, the displaced disk hinders the rise of the disk position detecting member 26 and the switch SW10 does not operate so that displacement of a disk or carrier can be detected.

The disk position detecting member 26 is formed to have a lift stroke corresponding to the carriers 20 engaged with the carrier pull-out member 36 and loading hook 40. In other words, the lift stroke of the disk position detecting member 26 corresponds to two stages of carrier.

While the disk position detecting member 26 rises, the rod-like protrusions 26a and 26b are inserted into the center holes of disks in the stocker and into the holes 20c of the carriers 20. In this case, the rod-like protrusion 26a abuts against the switch activating rod 11 to activate the switch SW10, whereas the rod-like protrusion 26b abuts against the stopper rod 6b on the back surface of the stopper cover.

There is a case wherein while the stocker 21 is raised, the carrier 20 is above the loading hook 40. In this case, because of the lift stroke of the disk position detecting member 26, the rod-like protrusion 26a is not inserted into the center holes of disks above the loading hook 40, and the rod-like protrusion 26a is not inserted into the holes 20c of the carriers 20. In such a case, however, as shown in FIG. 5, the cylindrical portion 6a is inserted into the center holes of disks above the loading hook 40, and the stopper rod 6b on the back surface of the stocker cover is inserted into the holes 20c of the carriers 20. Therefore, irrespective of the position of the stocker 21, even if vibration is applied while the disk position detecting member 26 rises, the carrier 20 and the disk on the carrier will not be displaced.

As shown in FIG. 6, as the disk position detecting member 26 lowers, the carrier 20 in the stocker 21 can be pulled out in respective directions by the carrier pull-out member and loading hook 40. Even if vibration is applied while the disk position detecting member 26 lowers, the carrier 20 will not be displaced because the carrier pull-out member 36 and loading hook 40 engage with the carriers 20 at the position where the rod-like protrusion 26b is not present.

If tapers are provided at the top ends of the rod-like protrusions 26a and 26b of the disk position detecting member 26, a small position displacement of a disk or carrier can be corrected while the disk position detecting member 26 rises. It is therefore possible to prevent the carrier 20 from contacting the loading hook 40 or carrier pull-out member 36 while the stocker 21 is moved up and down.

A brake member 60 shown in FIG. 4 and FIGS. 16 to 18 is supported to become capable of sliding back and forth, by being sandwiched between the main chassis 1 and holding member 55. A cam follower 60a of the brake member 60 engages with the cam 63b of the cam gear 63, and the brake member 60 is driven back and forth by the cam gear 63. A protrusion 60b of the brake member 60 stops the carrier gear 54 and a protrusion 60c thereof stops the inner teeth gear 52.

As described earlier, while the carrier gear 54 is stopped, the inner teeth gear 52 is rotatively driven, and while the inner teeth gear 52 is stopped, the carrier gear 54 is driven. Therefore, in accordance with a motion of the brake member 60, the transmission destination of the rotation force of the second motor 50 is switched. Specifically, the main slider 34 switches the transmission destination of the second motor 50. The brake member 60, its drive mechanism, and the planetary gear mechanism constitute transmission switching means.

The cam gear 63 shown in FIG. 4 and FIGS. 16 to 18 meshes with a gear 64 rotatively supported by the chassis 1 on a slightly right back side thereof. The gear 64 meshes with teeth 65a formed on a rotary member 65 rotatively supported by a shaft 1n of the main chassis 1. The shaft 65c of the rotary member 65 engages with a J-shaped groove 71a of a slider 71 supported at the rear portion of the main chassis 1 to become capable of sliding. A radius of the arc portion of the J-shaped groove 71a is equal to the rotation radius of the shaft 65c so that the slider 71 moves or stops while the rotary member 65 rotates.

Shafts 69a, 69a, . . . of a lift member 69 engage with vertical guide grooves 1b, 1b, . . . of the main chassis 1 and slanted lift guide grooves 71b, 71b, . . . of the slider 71. Therefore, the lift member 69 is moved up and down by the main slider 34 via the gear 62 to slider 71. A mechanism chassis 70 is mounted on the lift member 69 by using springs and dampers.

A disk motor is fixed to the mechanism chassis 70, and the turntable 70a is fixed to the rotary shaft of the disk motor. An optical pickup 70b is mounted on the mechanism chassis 70 to be fed in the radial direction of the disk placed on the turntable 70a. When the optical pickup 70b is at the home position remotest from the turntable 70a, an unrepresented switch SW1 is activated and the home position of the optical pickup is detected.

As the mechanism chassis 70 rises and the turntable 70a rises, the disk on the carrier 20 is clamped by the turntable 70a and clamper 10 and rotatively driven by the disk motor. While the disk rotates, the optical pickup 70b is fed in the radial direction of the disk to reproduce signals recorded in the disk. Components mounted on the mechanism chassis 70, clamper 10, and drive mechanism for the mechanism chassis 70 constitute reproducing means.

Levers 66 and 67 shown in FIG. 4 and FIGS. 16 to 18 at the position near the rotary member 65 are rotatively supported by the main chassis 1 in such a manner that holes 66a and 67a of the levers engage with the shaft of the main chassis 1. The levers are energized by an extension coil spring 68 and the rear ends thereof abut against the cam 65b of the rotary member 65. The front ends of the levers 66 and 67 abut against the switches SW4 and SW5, respectively.

As the rotary member 65 rotates, the levers 66 and 67 swing about the shaft fitted in the holes 66a and 67a. The levers 66 and 67 activate the switches SW4 and SW5. The switch SW4 turns on when the mechanism chassis 70 rises or immediately before it starts lowering, whereas the switch SW5 turns on when the mechanism chassis 70 lowers or immediately before it starts rising.

FIGS. 16(a) to 16(c) show the state before the cam gear 63 is rotated by the main slider 34. In this state, the disk position detecting member 26 is at the lower position and the inner teeth gear 52 is stopped by the brake member 60. The turntable 70a is at the raised position. The switches SW4 and SW5 are off.

FIGS. 17(a) to 17(c) show the state that the cam gear 63 is rotated by the main slider 34 to the intermediate position. In this state, the disk position detecting member 26 is at the raised position and the inner teeth gear 52 is stopped by the brake member 60. The turntable 70a is at the raised position. The switch Sw4 is on and the switch SW5 is off.

FIGS. 18(a) to 18(c) show the state that the cam gear 63 is rotated by the main slider to the maximum rotation angle. In this state, the disk position detecting member 26 is at the lower position and the carrier gear 54 is stopped by the brake member 60. The turntable 70a is at the lower position. The switch SW4 is off and the switch SW5 is on.

FIGS. 19(a) to (h) are chart showing operation timings of each component. The abscissa of each of FIGS. 19(a) to 19(h) represents a main slider stroke of the same scale. The motion start point A of the main slider indicates that the main slider is at the most advanced position. The main slider motion end point B indicates that the main slider is at the most retracted position.

FIGS. 19(b) and 19(c) show the motion periods of the slider tray 31 and carrier 20, respectively. The motion end point C of the slider tray 31 is earlier in time than the motion end point D of the carrier 20. FIG. 19(d) shows the up/down state of the disk position detecting member 26. FIG. 19(e) shows the up/down state of the turntable. The point G of the raised position of the turntable is detected by the switch SW4 as described previously.

FIG. 19(f) shows the rotation state of the cam gear 63. FIG. 19(g) shows the rotation enabled state of the components of the planetary gear mechanism. Before the point H, the carrier gear can rotate and after the point J the inner teeth gear can rotate. FIG. 19(h) shows the stocker up/down state and the motion state of the loading slider. Before the carrier gear rotation limit point H, the stocker is moved up and down. The loading slider is driven after the point F when the disk position detecting member 26 is lowered.

Figure 21:
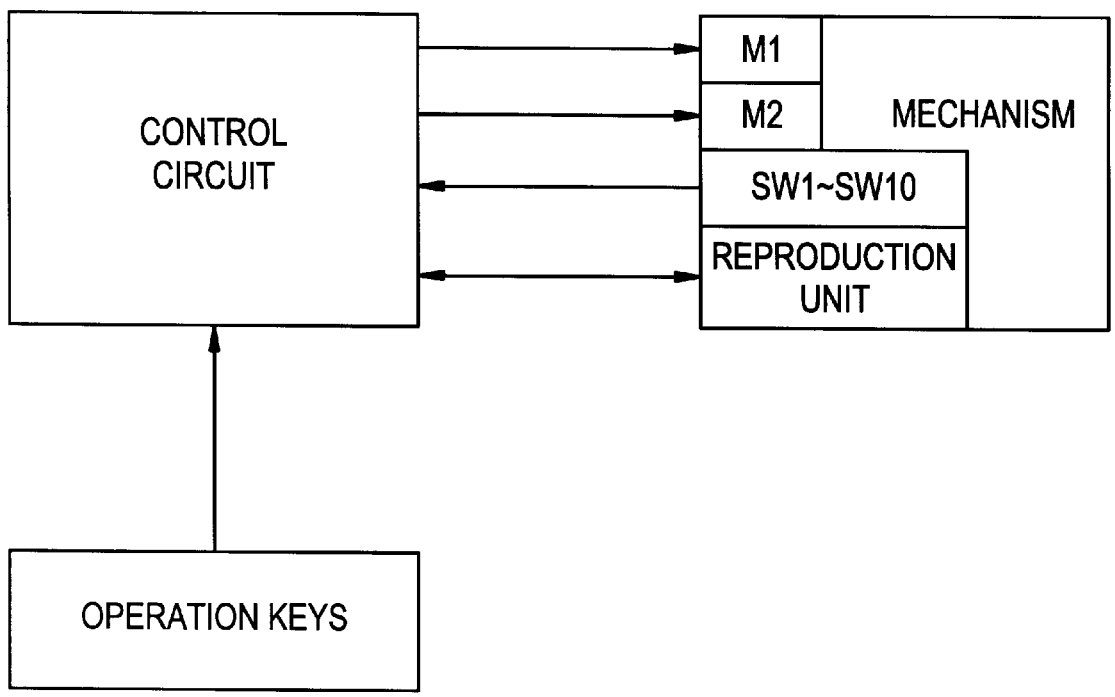
FIG. 21 is a block diagram of a control unit of the recorded medium reproducing apparatus according to the embodiment of the invention.
Figure 22A:
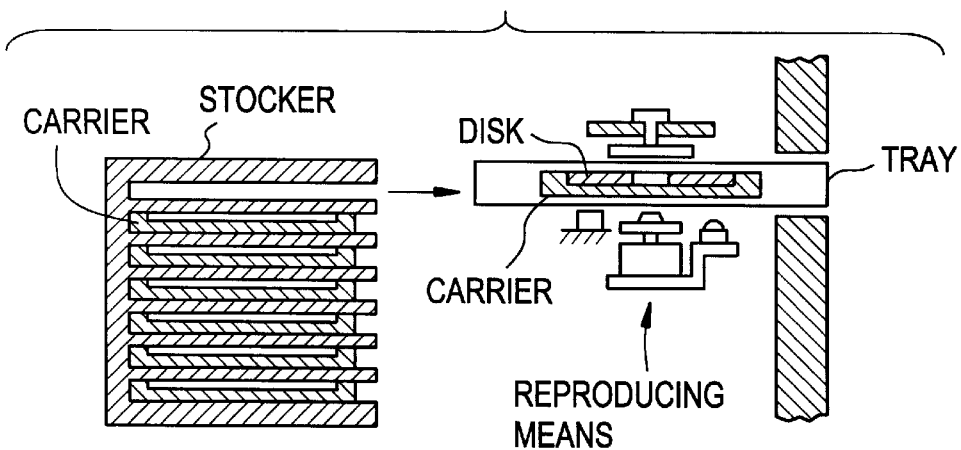
FIGS. 22(a) to 22 (c) are schematic diagrams showing the structure of a conventional recorded medium reproducing apparatus.
Figure 22B:
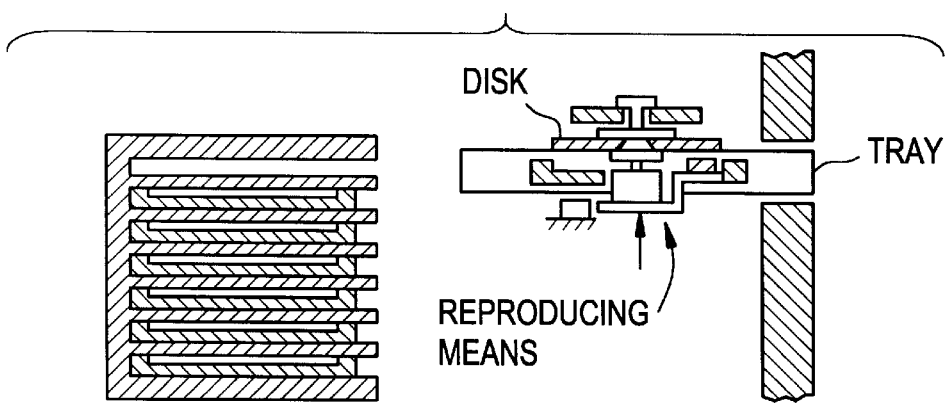
Figure 22C:
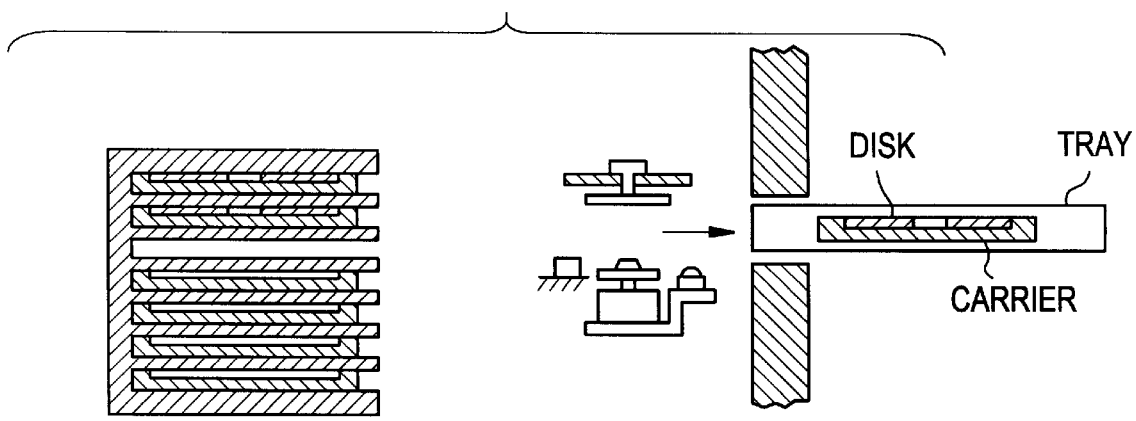

Next, the operation of the disk reproducing apparatus constructed as above will be described. A control circuit shown in FIG. 21 has a microcomputer, a memory, input/output interface units, a drive circuit, and the like. Signals from operation keys, switches SW1 to SW10, and a reproducing unit are input to the control circuit to drive the first motor 7 (M1) and second motor 50 (M2), to output a play signal to the reproducing unit, and to drive the disk motor and a pickup feed motor of the reproducing unit.

The apparatus is controlled by the control circuit in accordance with the operations of the switches SW1 to SW10 and inputs from unrepresented keys mounted on a front panel of the housing. In the initial stage, as shown in FIG. 7, the carrier pull-out member 36 and loading hook 40 are engaged with the carriers 20, 20 of the stocker 21. The main slider 34 is at the position just before it departs from the gear 62 which rotates in the clockwise direction as viewed down.

The turntable 70a is at the raised position. The stocker 21 is the lowermost position. The brake member 60 is at the back position as shown in FIG. 16(a) and the protrusion 60c engages with the inner teeth gear 52 to stop it (in this state, the switches SW2, SW4, and SW8 are on, and the switches SW5 and SW7 are off). Therefore, the second motor 50 can rotate only the carrier gear 54. The stocker lift slider 25 is therefore moved by the second motor so that the stocker 21 shown in FIGS. 2, 5, and 6 is moved up and down.

In this state, the stocker 21 is moved up and down to align the loading hook 40 with the height position of the carrier of a disk to be reproduced so that the disk to be reproduced can be selected. Specifically, the second motor raises the stocker 21, and the counter of the control circuit for storing the stocker position in accordance with on/off of the switch SW6 is counted up starting from "0" to align the height position of the carrier of the disk to be reproduced with that of the loading hook 40. The height position of the carrier 20 for exchanging disks may be aligned with that of the carrier pull-out member 36.

First, the disk exchange operation will be described. Disk exchange may be performed at the initial stage. Disk exchange can also be performed in the reproducing state that the loading hook 40 moved the carrier 20 onto the turntable 70a (in this state, the switch SW7 is on and the switch SW8 is off). Specifically, as described earlier, when the main slider 34 is at the position shown in FIG. 7, the turntable 70a is at the raised position. If the carrier 20 is moved onto the turntable 70a by the loading hook 40 before the turntable 70a rises, the disk on the carrier 20 is held by the turntable 70a and clamper 10 and is in the reproducing state. Even if the main slider 34 moves from the position shown in FIG. 7 toward the front side (lower side in FIG. 7), the state of the brake member 60 does not change so that the gear 52 does not rotate without any change in the reproducing state.

After the second motor 50 moves the stocker lift slider 25 and moves up and down the stocker 21 to align the height position of the carrier 20, whose disk is to be exchanged, with that of the carrier pull-out member 36, the main slider 34 is moved forward by the first motor 7.

At the initial stage of the motion stroke of the main slider 34, the rotary member 35 shown in FIG. 3 rotates in the clockwise direction as viewed down, and its shaft 35a engages with the J-shaped groove 2a of the right side chassis shown in FIG. 9 at the portion perpendicular to the motion direction of the slider tray 31. Therefore, the back and forth motion of the shaft 35a of the rotary member 35 is stopped so that the slider tray 31 supporting the rotary member 35 does not move.

Similarly, the carrier pull-out member 36 does not move at the initial stage of the forward stroke of the main slider 34. At the intermediate stage of the forward stroke of the main slider 34, the rotary member 37 shown in FIG. 10 rotates by being guided by the recess 34c of the main slider 34, and the shaft 37a of the rotary member 37 enters the straight portion of the J-shaped groove 31a so that the carrier pull-out member 36 is driven forth. The front end portion of the carrier 20 is transported and placed on the tongues 32a, 32a of the lower plate 31 and supported by the slider tray 31.

As the main slider 34 moves further, as shown in FIG. 11 the recess 34d of the main slider 34 engages with the shaft 35a so that the rotary member 35 rotates in the counter-clockwise direction. Then, the shaft 35a engages with the J-shaped groove 2a at the portion extending to the motion direction of the slider tray 31 so that the slider tray 31 becomes movable and the shaft 35a is pushed by the recess 34d. Therefore, the slider tray 31 moves forward, i.e., in the direction of protruding from the housing.

Specifically, the slider tray 31 moves from the position shown in FIG. 7 to the position shown in FIG. 8. At this time, the switch SW3 turns off. In the state shown in FIG. 8, the slider tray 31 protrudes from the housing and also the carrier 20 is pulled out together with the slider tray 31 by the carrier pullout member 36. In the state shown in FIG. 8, the disk on the carrier 20 can be exchanged or a new disk can be placed on the carrier 20.

In accommodating the carrier 20 in the stocker 21, the motor 7 is rotated in the reverse direction. In this case, the shaft 35a is guided by the J-shaped groove 2a and the rotary member 35 rotates in the clockwise direction. Therefore, after the slider tray 31 is retracted (which is detected from an on-state of the switch SW4), the main slider 34 can be retracted further.

A presence/absence of a disk on the carrier 20 is detected from a signal from the light receiving element 74 which signal is generated when the slider tray 31 is retracted and the carrier 20 is accommodated in the stocker 21. In accordance with this detected information, a control circuit operates to store information of a presence/absence of a disk at each stage of the stocker 21. Since the distance C shown in FIG. 6 is shorter than the thickness of a disk, it is possible to prevent two disks on the carrier from being moved into the housing. By repeating the operations of selecting a carrier by moving up and down the stocker and protruding the selected carrier from the housing to exchange disks, disks of all carriers can be exchanged. Next, the operation of reproducing a desired disk on the carrier, starting from the initial stage, will be described. In the initial stage shown in FIG. 7, when a key is entered to instruct to reproduce a disk at an optional stage of the stocker 21, a disk reproduction operation is executed if the disk is present at that stage. In the disk reproduction operation, the stocker is moved up and down to align the carrier 20, whose disk is to be reproduced, with the loading hook 40. Thereafter, the first motor 7 retracts the main slider 34 so that the teeth of the gear 62 mesh with the rack 34b and the gear 62 and cam gear 63 rotate in the counter-clockwise direction.

Then, the turntable 71a lowers from its raised position and the brake member 60 moves forth to stop the carrier gear 54. This is detected from an on-state of the switch SW5. This state is shown in FIG. 18(a). While the cam gear 63 rotates from the point D to point B shown in FIG. 19(f), the disk position detecting member 26 rises once and then lowers as shown in FIG. 19(d).

The inner teeth gear 52 is therefore rotated by the second motor 50 and the loading slider 9 is moved back. The carrier 20 is moved onto the turntable 70a by the loading slider 9 via the loading hook 40 (this state is detected from an on-state of the switch SW7).

Thereafter, by the rotation opposite in the direction to the preceding state of the first motor 7, the main slider 34 is moved forth (toward the position shown in FIG. 7) to the position just before it departs from the gear 62, and the turntable 70a rises to clamp the disk and the reproducing state starts (this state is detected from an on-state of the switch SW4). In this state, the first motor 7 is under the conditions that it moves the main slider 34 so that disks can be exchanged as described above. Namely, with this apparatus, disks can be exchanged during the reproducing state.

After the disk reproduction, the disk is moved back to the stocker 21. This operation is performed by rotating the first and second motors 7 and 50 in the directions opposite to those when a disk is mounted on the turntable. Specifically, the main slider 34 is first moved by the motor 50 from the point D to point B shown in FIG. 19(f)(the main slider 34 is retracted from the position shown in FIG. 7 and this state is detected from an on-state of the switch SW5). Thereafter, the second motor 50 moves forth the loading slider 9 from the reproducing position to the position shown in FIG. 14(a) to accommodate the carrier 20 in the stocker 21. This state is the initial stage shown in FIG. 7.

In the above manner, reproduction of a disk or exchange of disks in the stocker is carried out. When the slider tray 31 is moved from the outside of the housing to the inside of the housing, i.e., when the carrier 20 is moved from the outside of the hosing into the stocker 21, the main slider 34 moves to the point G shown in FIG. 19(e)(this is detected from an on-state of the switch SW4). By moving the main slider 34 in the above manner, the disk position detecting member 26 rises. However, if the disk position detecting member 26 is hindered to move up by a displaced disk or carrier 20, the switch SW10 is not activated. In this case, the slider tray 31 is moved to the outside of the housing. After the position displacement of the disk is corrected, the slider tray 31 is moved to the inside of the housing.

Also when the carrier 20 is moved back to the stocker 21 from the reproducing position, the disk position detecting member 26 is raised, and if there is a position displacement of a disk or carrier 20, the returned carrier is ejected to the outside of the housing. In this case, after the height position of the carrier to be ejected is aligned with that of the carrier pull-out member 36 by lowering the stocker 21 by one stage of carrier, the main slider 33 is moved to the outside of the housing.

In stopping the apparatus after disk reproduction or disk exchange, the disk position detecting member 26 is moved up and the stocker 21 is lowered to make the disk position detecting member 26 insert into holes of all the disks and carriers in the stocker. With this arrangement, even if a force is applied to a disk and carrier in the stocker while the apparatus is moved or the like, the position displacement of the carrier and disk does not occur.

With the conventional disk reproducing apparatus disclosed in Japanese Patent Laid-open Publication No. 4-38673, a disk is exchanged at the outside of the housing passing the reproduction position. Therefore, a disk transport distance is long and it takes a long time for disk exchange. Furthermore, since a presence/absence of a disk is checked by using a pickup, the disk reproducing means is required to be driven each time a disk is exchanged so that the apparatus durability is adversely affected. With the structure of this embodiment, a disk transport distance is short, a disk can be exchanged in a short time, and the apparatus durability can be improved. Furthermore, if a reproduction instruction is issued to a stage not holding a disk, this instruction is neglected and unnecessary operations can be avoided to further improve the apparatus durability.

According to the recorded medium reproducing apparatus of this invention, it is possible to accommodate a plurality of recorded media and exchange a recorded medium in a stocker even during the reproduction of another recorded medium. Furthermore, Even if the second instructing means instructs to transport the recorded medium holder in the stocker not holding a recorded medium, the second transport means is not operated. It is therefore possible to provide a recorded medium reproducing apparatus easy to use and good in durability.

What is claimed is:

1. A recorded medium reproducing apparatus comprising:
   a stocker having a plurality of recorded medium stocking positions to accommodate recorded media;
   reproducing means for reproducing a recorded medium;

first transport means for transporting the recorded medium horizontally between the inside of said stocker and the outside of an apparatus housing;

second transport means for transporting the recorded medium between the inside of said stocker and a reproduction position;

positioning means for determining a relative position of the recorded medium and said first or second transport means by moving said stocker upwardly and downwardly so as to coincide a position of said recorded medium to be transported with a position of said first or second transport means;

recorded medium detecting means for detecting a presence/absence of the recorded medium at each of recorded medium stocking positions of said stocker;

store means for storing information of presence/absence based on the detected results;

first instructing means for instructing to operate said first transport means by indicating the recorded medium stocking position of said stocker for the recorded medium exchange or mounting;

second instructing means for instructing to operate said second transport means by indicating the recorded medium stocking position of said stocker for the recorded medium reproduction; and control means in response to an instruction from said first instructing means for operating said positioning means and said first transport means to transport the recorded medium at the recorded medium stocking position indicated by said first instructing means and in response to an instruction from said second instructing means for operating said positioning means and said second transport means to transport the recorded medium at the recorded medium stocking position indicated by said second instructing means, wherein said control means in response to the instruction from said second instructing means accesses the information for presence/absence stored in said store means before operating said positioning means and said second transport means and then operates said positioning means and said second transport means if the recorded medium on the recorded medium stocking position indicated by the second instruction means is present.

2. The recorded medium reproducing apparatus according to claim 1, wherein said stocker includes at each of the recorded medium stocking positions a carrier on which the recorded medium is detachably mounted, the carrier being transported with the recorded medium thereon by said first or second transport means.

3. The recorded medium reproducing apparatus according to claim 2, wherein said detecting means detects whether the recorded medium is present or absent on the carrier when the carrier is transported into the stocker.

4. The recorded medium reproducing apparatus according to claim 1, wherein the recorded medium is exchanged by operating the first transport means and the positioning means during the reproduction of the recorded medium.

5. A disk reproducing apparatus comprising a stocker (21) provided with a plurality of shelves (21a) each of which is adapted to mount a carrier (20), a disk being deposited on the carrier;

a reproducing unit comprising a turntable, optical pickup and turntable drive motor;

a first slider (31) provided with a first hook (36) engaged with the carrier and movable to transport the engaged carrier between the inside of said stocker and the outside of an apparatus housing for a disk exchange or disk mounting;

a second slider (9) provided with a second hook (40) engaged with the carrier and movable to transport the engaged carrier between the inside of said stocker and the turntable for a disk reproduction;

a third slider (25) provided with steps (25c) engaged with said stocker and movable to elevate the engaged stocker upwardly and downwardly so that a selected carrier in said stocker is engaged with the first hook (36) or the second hook (40) for transportation;

a sensor (62) for detecting whether the disk is present or absent on each of the carriers in said stocker;

or key for generating a first instruction to exchange a mount the disk on a selected carrier in said stocker and a second instruction to reproduce the disk on the selected carrier in said stocker;

a control unit comprising a memory for storing information of presence/absence detected by said sensor for each of the carriers in said stocker and a control circuit in response to the first instruction for operating said third and first sliders to transport the disk on the selected carrier, and in response to the second instruction for operating the third and second sliders to transport the disk on the selected carrier in said stocker, wherein said control circuit in response to the second instruction accesses the information for presence/absence stored in the memory before operating the third and second sliders, and then operates said third and second sliders if the disk on the selected carrier is present.

6. The disk reproducing apparatus according to claim 5, wherein the disk is exchanged by operating the first and third sliders during the reproduction of the disk.

* * * * *